(12) United States Patent
Irisawa

(10) Patent No.: US 12,514,454 B2
(45) Date of Patent: Jan. 6, 2026

(54) INSERT AND PHOTOACOUSTIC MEASUREMENT DEVICE COMPRISING INSERT

(71) Applicant: FUJIFILM CORPORATION, Tokyo (JP)

(72) Inventor: Kaku Irisawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 866 days.

(21) Appl. No.: 16/695,194

(22) Filed: Nov. 26, 2019

(65) Prior Publication Data

US 2020/0093372 A1  Mar. 26, 2020

Related U.S. Application Data

(63) Continuation of application No. PCT/JP2018/018013, filed on May 9, 2018.

(30) Foreign Application Priority Data

May 31, 2017 (JP) ................................. 2017-108678

(51) Int. Cl.
*A61B 5/00* (2006.01)
*A61B 10/02* (2006.01)

(52) U.S. Cl.
CPC .......... *A61B 5/0095* (2013.01); *A61B 5/6848* (2013.01); *A61B 5/6852* (2013.01); *A61B 10/0283* (2013.01)

(58) Field of Classification Search
None
See application file for complete search history.

(56) References Cited

U.S. PATENT DOCUMENTS

| 2010/0092143 A1* | 4/2010 | Ushiwata | G02B 6/122 |
| | | | 385/129 |
| 2015/0032190 A1* | 1/2015 | Acker | B29D 11/00663 |
| | | | 362/558 |
| 2015/0297092 A1* | 10/2015 | Irisawa | A61B 17/3403 |
| | | | 600/407 |

FOREIGN PATENT DOCUMENTS

| JP | 2009-031262 A | 2/2009 |
| JP | 2015-231582 A | 12/2015 |
| WO | 2017/038036 A1 | 3/2017 |

OTHER PUBLICATIONS

Fabrication of fiber collimate lens with liquid resin droplet by T. Jitsuno et al.; Pub. Optica Publishing Group, 2004; pp. 1-4 (Year: 2004).*

(Continued)

*Primary Examiner* — Pascal M Bui Pho
*Assistant Examiner* — Michael S Kellogg
(74) *Attorney, Agent, or Firm* — SOLARIS Intellectual Property Group, PLLC

(57) ABSTRACT

There is provided an insert including: a puncture needle main body which has an opening at a tip and is formed in a hollow shape and of which at least a tip portion is inserted into a subject; an optical fiber that is provided in a hollow portion of the puncture needle main body along a length direction of the puncture needle main body; and a photoacoustic wave generation portion that is provided at a light emission end of the optical fiber disposed on a tip side of the puncture needle main body, absorbs light emitted from the light emission end, and generates photoacoustic waves. A resin member provided at the light emission end of the optical fiber is formed in a shape having curvature.

11 Claims, 15 Drawing Sheets

(56) References Cited

OTHER PUBLICATIONS

Development of Novel Tunable Light Scattering Coating Materials for Fiber Optic Diffusers in Photodynamic Cancer Therapy by Kstanski et al.; Pub. Journal of Applied Polymer Science,vol. 112, 1516-1523(2009) (Year: 2009).*
How to properly polish fiber-optic connectors by Fred Fons. Pub. online at <https://www.lightwaveonline.com/network-design/article/16652851/how-to-properly-polish-fiberoptic-connectors> on Feb. 1, 1997 (Year: 1997).*
H. Sakata and A. Imada, "Lensed plastic optical fiber employing concave end filled with high-index resin," in Journal of Lightwave Technology, vol. 20, No. 4, pp. 638-642, Apr. 2002, doi: 10.1109/50.996584. (Year: 2002).*
International Search Report issued in International Application No. PCT/JP2018/018013 on Jun. 12, 2018.
Written Opinion of the ISA issued in International Application No. PCT/JP2018/018013 on Jun. 12, 2018.
Sato, Shunichi et al., "Photoacoustic Medical Monitoring and Diagnostics", Japanese Journal of Optics, vol. 30, No. 10, 2001, pp. 658-662.
Ohba, Kenkichi et al., "Development of Miniaturized Fiber-optic Laser Doppler Velocimetry Sensor for Measurement of Local Blood Velocity (Fabrication of Convex or Concave Lens-like Fiber Tip and the Characteristics of Sensor Optical System )", Transactions of the Japan Society of Mechanical Engineers (vol. B), Aug. 2005, vol. 71, No. 708, pp. 128-135.
Nomiyama, Tetsu et al., "Effects of Laser Irradiation on Gastric Mucosa (Seventh Report): Basic and Clinical Research Into Endoscope Applications of Contact-type Light guiding Terminals", Gastroenterological Endoscopy, Aug. 1985, vol. 27(8), pp. 1562-1567.
Mifune, Hironobu et al., "The Precise Assemble Technique for the high NA Microlens", Ricoh Technical Report, No. 27, Nov. 2001, pp. 27-34.
Watanabe, Norikazu et al., "Self-forming Connection Technology for Optical Wiring and Optical Elements", Meeting records and abstracts of the 17th academic lecture conference of the Japan Institute of Electronics Packaging, Oct. 2003, 14B-06.

* cited by examiner

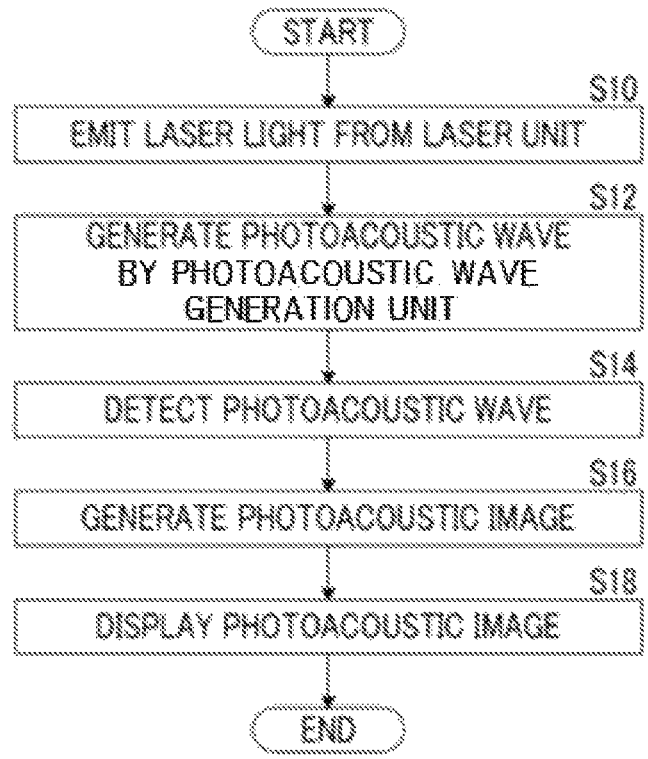
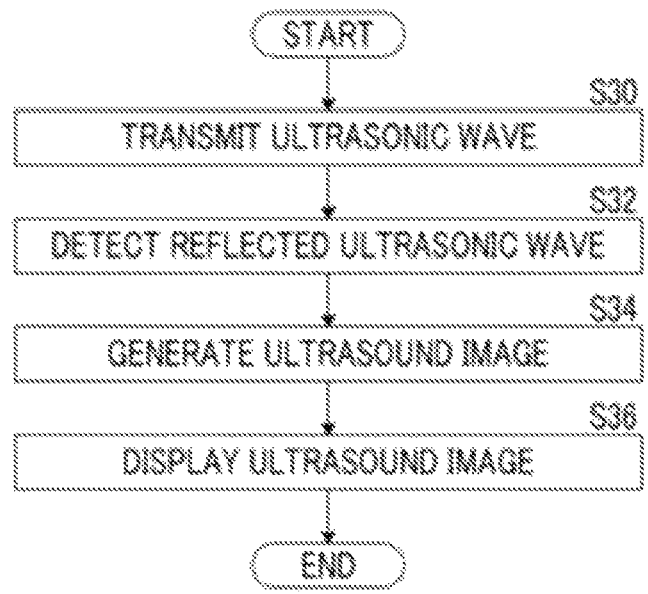

INSERT AND PHOTOACOUSTIC MEASUREMENT DEVICE COMPRISING INSERT

CROSS-REFERENCE TO RELATED APPLICATIONS

This application is a continuation application of International Application No. PCT/JP2018/018013, filed May 9, 2018, the disclosure of which is incorporated herein by reference in its entirety. Further, this application claims priority from Japanese Patent Application No.2017-108678, filed May 31, 2017, the disclosure of which is incorporated herein by reference in its entirety.

BACKGROUND OF THE INVENTION

1. Field of the Invention

The present invention relates to an insert which comprises a photoacoustic wave generation portion that absorbs light and generates photoacoustic waves and of which at least a portion is inserted into a subject and a photoacoustic measurement device comprising the insert.

2. Description of the Related Art

An ultrasonography method has been known as a kind of image inspection method that can non-invasively inspect the internal state of a living body. In ultrasonography, an ultrasound probe that can transmit and receive ultrasonic waves is used. In a case in which the ultrasound probe transmits ultrasonic waves to a subject (living body), the ultrasonic waves travel in the living body and are reflected from the interface between tissues. The ultrasound probe receives the reflected ultrasonic waves and a distance is calculated on the basis of the time until the reflected ultrasonic waves return to the ultrasound probe. In this way, it is possible to capture an image indicating the internal aspect of the living body.

In addition, photoacoustic imaging has been known which captures the image of the inside of a living body using a photoacoustic effect. In general, in the photoacoustic imaging, the inside of the living body is irradiated with pulsed laser light. In the inside of the living body, a living body tissue absorbs the energy of the pulsed laser light and ultrasonic waves (photoacoustic waves) are generated by adiabatic expansion caused by the energy. For example, an ultrasound probe detects the photoacoustic waves and a photoacoustic image is formed on the basis of a detection signal. In this way, it is possible to visualize the inside of the living body on the basis of the photoacoustic waves (for example, see JP2009-031262A).

In addition, as a technique related to the photoacoustic imaging, JP2015-231582A discloses a puncture needle in which a photoacoustic wave generation portion that absorbs light and generates photoacoustic waves is provided in the vicinity of a tip. In the puncture needle, an optical fiber is provided up to the tip of the puncture needle and light guided by the optical fiber is emitted to the photoacoustic wave generation portion. An ultrasound probe detects the photoacoustic waves generated by the photoacoustic wave generation portion and a photoacoustic image is generated on the basis of a detection signal of the photoacoustic waves. In the photoacoustic image, the photoacoustic wave generation portion appears as a bight point, which makes it possible to check the position of the puncture needle using the photoacoustic image.

SUMMARY OF THE INVENTION

Here, for example, in a case in which photoacoustic imaging is performed using the puncture needle disclosed in JP2015-231582A, the photoacoustic wave generation portion is irradiated with light guided by the optical fiber as described above. In general, a light emission end of the optical fiber is polished flat and light is emitted from the flat surface.

The photoacoustic wave generation portion irradiated with light is disposed in the vicinity of the flat optical fiber and the photoacoustic waves are emitted from the flat surface as a vibration surface. Therefore, directivity indicating the angular distribution of an acoustic output in which the strongest photoacoustic waves are emitted in a direction parallel to the length direction of the puncture needle (the insertion direction of the puncture needle) is obtained.

Therefore, for example, in a case in which the puncture needle generates photoacoustic waves while being inserted into the subject and the ultrasound probe disposed on the surface of the subject detects the photoacoustic waves, there is a problem that the detection sensitivity of the photoacoustic waves by the ultrasound probe that is generally disposed on the side of the puncture needle is reduced due to the directivity of the photoacoustic waves.

As described above, in a case in which the puncture needle emits the photoacoustic waves having high directivity, the photoacoustic waves are reflected in the subject and the ultrasound probe detects the reflected photoacoustic waves, which causes a so-called artifact in which a strong signal appears at a position that does not correspond to the position of the tip of the puncture needle.

The invention has been made in view of the above-mentioned problems and an object of the invention is to provide an insert that can detect a tip of the insert, such as a puncture needle, with high sensitivity and a photoacoustic measurement device comprising the insert.

According to the invention, there is provided an insert comprising: an insert main body which has an opening at a tip and is formed in a hollow shape and of which at least a tip portion is inserted into a subject; a light guide member that is provided in a hollow portion of the insert main body along a length direction of the insert main body; and a photoacoustic wave generation portion that is provided at a light emission end of the light guide member which is disposed on a tip side of the insert main body, absorbs light emitted from the light emission end, and generates photoacoustic waves. The light emission end of the light guide member is formed in a shape having curvature.

In the insert according to the invention, the light emission end of the light guide member may have a hemispherical shape.

In the insert according to the invention, the light guide member may include an optical fiber and a resin member that is provided at a light emission end of the optical fiber, is formed in a shape having the curvature, and transmits light.

In the insert according to the invention, the resin member may be made of a resin having light diffusion properties.

In the insert according to the invention, the resin member may include a pigment that imparts light diffusion properties.

In the insert according to the invention, the resin member may include a molecule that imparts light diffusion properties.

In the insert according to the invention, a surface of the light emission end of the optical fiber may be rougher than a surface of a light incident end of the optical fiber.

In the insert according to the invention, a primer layer may be formed between the optical fiber and the resin member.

In the insert according to the invention, the resin member may be made of an ultraviolet-curable resin.

In the insert according to the invention, the light guide member may be an optical fiber, and a light emission end of the optical fiber may be polished into a shape having the curvature.

In the insert according to the invention, a surface of the light emission end of the optical fiber may be rougher than a surface of a light incident end of the optical fiber.

In the insert according to the invention, a primer layer may be formed between the optical fiber and the photoacoustic wave generation portion.

In the insert according to the invention, the photoacoustic wave generation portion may be made of an ultraviolet-curable resin including a pigment that absorbs light guided by the light guide member.

In the insert according to the invention, the ultraviolet-curable resin may function as an adhesive that fixes the photoacoustic wave generation portion to the insert main body.

In the insert according to the invention, the insert main body may be a needle that is inserted into the subject.

In the insert according to the invention, the insert main body may be a catheter.

According to the invention, there is provided a photoacoustic measurement device comprising: the insert according to the invention; a light source unit that emits light which is absorbed by the photoacoustic wave generation portion of the insert; and an acoustic wave detection unit that detects photoacoustic waves generated from the photoacoustic wave generation portion after at least a portion of the insert is inserted into the subject.

The insert according to the invention comprises: an insert main body which has an opening at a tip and is formed in a hollow shape and of which at least a tip portion is inserted into a subject; a light guide member that is provided in a hollow portion of the insert main body along a length direction of the insert main body; and a photoacoustic wave generation portion that is provided at a light emission end of the light guide member which is disposed on a tip side of the insert main body, absorbs light emitted from the light emission end, and generates photoacoustic waves. The light emission end of the light guide member is formed in a shape having curvature. Therefore, the directivity of the photoacoustic waves increases and it is possible to detect the tip of the insert, such as a puncture needle, with high sensitivity.

BRIEF DESCRIPTION OF THE DRAWINGS

FIG. 3 is a flowchart illustrating a photoacoustic image generation process.

FIG. 4 is a flowchart illustrating an ultrasound image generation process.

DESCRIPTION OF THE PREFERRED EMBODIMENTS

Figure 1:
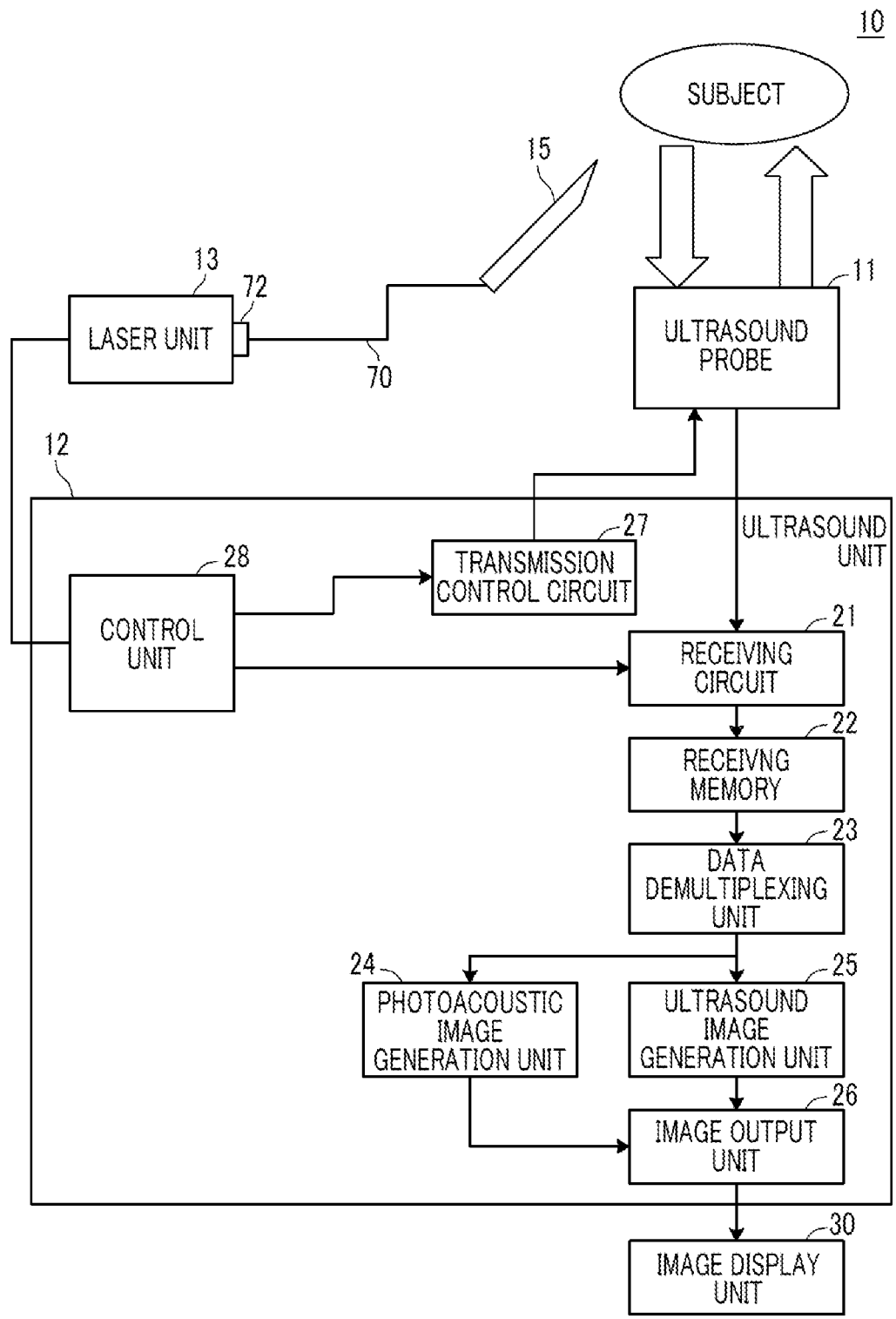
FIG. 1 is a block diagram schematically illustrating the configuration of a photoacoustic image generation apparatus comprising a puncture needle using a first embodiment of an insert according to the invention.

Hereinafter, a photoacoustic image generation apparatus 10 comprising a puncture needle using a first embodiment of an insert according to the invention will be described in detail with reference to the drawings. The photoacoustic image generation apparatus 10 according to this embodiment is characterized by the configuration of the puncture needle. First, the overall configuration of the photoacoustic image generation apparatus 10 will be described. FIG. 1 is a diagram schematically illustrating the configuration of the photoacoustic image generation apparatus 10 according to this embodiment.

As illustrated in FIG. 1, the photoacoustic image generation apparatus 10 according to this embodiment comprises an ultrasound probe 11, an ultrasound unit 12, a laser unit 13, and a puncture needle 15. The puncture needle 15 and the laser unit 13 are connected by an optical cable 70 having an optical fiber. The optical cable 70 includes a portion extending from an optical fiber 14 in the puncture needle 15, which will be described below, and has an end at which a connector 72 is provided. The laser unit 13 is connected to the connector 72. The puncture needle 15 and the optical cable 70 are disposable. In addition, in this embodiment, ultrasonic waves are used as acoustic waves. However, the invention is not limited to the ultrasonic waves. Acoustic waves with an audible frequency may be used as long as an appropriate frequency can be selected according to, for example, an inspection target or measurement conditions. In addition, for example, a syringe or a transfusion tube is connected to the puncture needle 15 and can be used to inject a medical solution, which is not illustrated in FIG. 1.

The laser unit 13 corresponds to a light source unit according to the invention and comprises, for example, a semiconductor laser light source. Laser light emitted from a laser diode light source of the laser unit 13 is guided by the optical cable 70 and is incident on the puncture needle 15. The laser unit 13 according to this embodiment emits pulsed laser light in a near-infrared wavelength range. The near-infrared wavelength range means a wavelength range of about 700 nm to 2000 nm. In addition, in this embodiment, the laser diode light source is used. However, other laser light sources, such as a solid-state laser light source, a fiber laser light source, and a gas laser light source, may be used or, for example, a light emitting diode light source other than the laser light source may be used.

Figure 2:
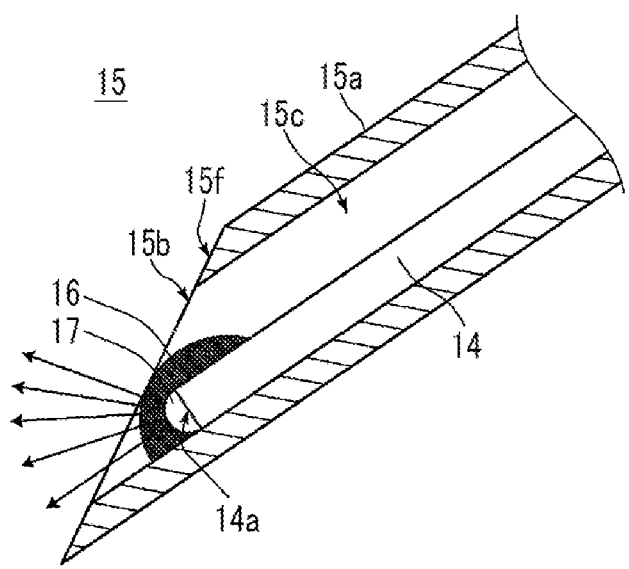
FIG. 2 is a diagram illustrating the configuration of a tip portion of a puncture needle according to the first and second embodiments.

The puncture needle 15 is an embodiment of an insert according to the invention and is a needle of which at least a portion is inserted into a subject. FIG. 2 is a diagram illustrating the configuration of the vicinity of the tip of the puncture needle 15. FIG. 2 is a cross-sectional view including a central axis that extends in a length direction of the puncture needle 15. As illustrated in FIG. 2, the puncture needle 15 comprises a puncture needle main body 15a, the optical fiber 14, a resin member 17, and a photoacoustic wave generation portion 16. In this embodiment, the optical fiber 14 and the resin member 17 correspond to a light guide member according to the invention.

The puncture needle main body 15a is made of, for example, metal, has an opening 15b at the tip, and is formed in a hollow shape. The diameter (inside diameter) of a hollow portion 15c of the puncture needle main body 15a may be so large that the optical fiber 14 which will be described below can be provided in the hollow portion 15c and is, for example, equal to or greater than 0.13 mm and equal to or less than 2.64 mm.

The optical fiber 14 is provided along the length direction of the puncture needle main body 15a in the hollow portion 15c of the puncture needle main body 15a. The resin member 17 is provided at one end (light emission end) 14a of the optical fiber 14 which is close to the tip of the puncture needle main body 15a. The photoacoustic wave generation portion 16 is provided so as to cover the resin member 17 and a tip portion of the optical fiber 14. Then, light guided by the optical fiber in the optical cable 70 is incident on the resin member 17.

The resin member 17 is made of a resin that transmits the light guided by the optical fiber 14. In this embodiment, the resin member 17 is formed in a hemispherical shape at the light emission end 14a of the optical fiber 14. It is preferable that the transmittance of the resin member 17 with respect to the light guided by the optical fiber 14 is equal to or greater than 80%. Examples of the material forming the resin member 17 include epoxy-based resins, acryl-based resins, and polyurethane-based resins. It is preferable that the resin member 17 is made of a photocurable resin, such as an ultraviolet-curable resin, or a thermosetting resin. In this embodiment, in a case in which this material is in a liquid state before being cured, the hemispherical resin member 17 is formed by the surface tension of this material which is brought into contact with the light emission end 14a of the optical fiber 14 and is then attached thereto. It is preferable that the diameter of the hemispherical resin member 17 is equal to or greater than the diameter of the optical fiber 14.

The light which has been guided by the optical fiber 14 and then incident on the resin member 17 is emitted from a hemispherical surface of the resin member 17. This configuration makes it possible to emit light from a surface that is not flat.

As described above, the photoacoustic wave generation portion 16 is provided so as to cover the resin member 17 and the tip portion of the optical fiber 14, absorbs light emitted from the resin member 17, and generates photoacoustic waves. In this embodiment, light emitted from the entire surface of the hemispherical resin member 17 is incident on the photoacoustic wave generation portion 16 and the hemispherical surface vibrates due to adiabatic expansion. Therefore, as represented by an arrow in FIG. 2, it is possible to increase the emission angle of the photoacoustic waves. As a result, it is possible to improve the photoacoustic wave detection sensitivity of the ultrasound probe 11 and to suppress the generation of artifacts.

The photoacoustic wave generation portion 16 is made of a material including a light absorber that absorbs light guided by the optical fiber 14 and a resin containing the light absorber. An example of the material forming the photoacoustic wave generation portion 16 is a synthetic resin, such as an epoxy resin, a fluorine resin, a silicone resin, an acrylic resin, or a polyurethane resin mixed with a black pigment that absorbs light. In addition, carbon black or titanium black, such as titanium oxide (TiO), may be mixed with the synthetic resin. Further, for example, a thermosetting resin or a photocurable resin can be used as the synthetic resin. The photoacoustic wave generation portion 16 is fixed to the inner wall of the puncture needle main body 15a by the adhesion of the thermosetting resin or the photocurable resin.

In FIG. 2, the photoacoustic wave generation portion 16 and the optical fiber 14 are drawn such that the photoacoustic wave generation portion 16 is larger than the optical fiber 14. However, the invention is not limited thereto. The size of the photoacoustic wave generation portion 16 may be substantially equal to the diameter of the optical fiber 14. In the puncture needle 15 illustrated in FIG. 2, the photoacoustic wave generation portion 16 is disposed in the puncture needle 15 so as not to protrude from a polished surface 15ƒ of the puncture needle 15. However, in practice, it is preferable that the photoacoustic wave generation portion 16 is disposed as close to the tip of the puncture needle 15 as possible in the range in which the photoacoustic wave generation portion 16 does not protrude from the polished surface 15ƒ.

Returning to FIG. 1, the ultrasound probe 11 corresponds to an acoustic wave detection unit according to the invention and includes, for example, a plurality of detector elements (ultrasound transducers) which are one-dimensionally arranged. The ultrasound probe 11 detects the photoacoustic waves generated from the photoacoustic wave generation portion 16 after the puncture needle 15 is inserted into the subject. The ultrasound probe 11 performs the transmission of acoustic waves (ultrasonic waves) to the subject and the reception of reflected acoustic waves (reflected ultrasonic waves) with respect to the transmitted ultrasonic waves, in addition to the detection of the photoacoustic waves. The transmission and reception of the ultrasonic waves may be performed at different positions. For example, ultrasonic waves may be transmitted from a position different from the position of the ultrasound probe 11 and the ultrasound probe 11 may receive the reflected ultrasonic waves with respect to the transmitted ultrasonic waves. For example, a linear ultrasound probe, a convex ultrasound probe, or a sector ultrasound probe can be used as the ultrasound probe 11. In addition, a two-dimensional array may be used.

The ultrasound unit 12 includes a receiving circuit 21, a receiving memory 22, a data demultiplexing unit 23, a photoacoustic image generation unit 24, an ultrasound image generation unit 25, an image output unit 26, a transmission control circuit 27, and a control unit 28. The ultrasound unit 12 typically includes, for example, a processor, a memory, and a bus. A program related to the generation of a photoacoustic image and the generation of an ultrasound image is incorporated into the memory of the ultrasound unit 12. The program is executed by the control unit 28 which is formed by a processor to implement the functions of the data demultiplexing unit 23, the photoacoustic image generation unit 24, the ultrasound image generation unit 25, and the image output unit 26. That is, each of these units is formed by the processor and the memory into which the program has been incorporated.

In this embodiment, the processor executes the program to implement the functions of each unit. However, the invention is not limited thereto and some or all of the functions may be implemented by hardware. The hardware configuration is not particularly limited and can be implemented by an appropriate combination of, for example, a plurality of integrated circuits (ICs), an application specific integrated circuit (ASIC), a field-programmable gate array (FPGA), a memory, and a circuit including a discrete component.

The receiving circuit 21 receives a detection signal output from the ultrasound probe 11 and stores the received detection signal in the receiving memory 22. The receiving circuit 21 typically includes a low-noise amplifier, a variable-gain amplifier, a low-pass filter, and an analog-to-digital converter (AD converter). The detection signal of the ultrasound probe 11 is amplified by the low noise amplifier. Then, gain adjustment corresponding to a depth is performed by the variable-gain amplifier and a high-frequency component of the detection signal is cut by the low-pass filter. Then, the detection signal is converted into a digital signal by the AD converter and the digital signal is stored in the receiving memory 22. The receiving circuit 21 is formed by, for example, one integral circuit (IC).

The ultrasound probe 11 outputs a detection signal of the photoacoustic waves and a detection signal of the reflected ultrasonic waves. The AD-converted detection signals (sampling data) of the photoacoustic waves and the reflected ultrasonic waves are stored in the receiving memory 22. The data demultiplexing unit 23 reads the sampling data of the detection signal of the photoacoustic waves from the receiving memory 22 and transmits the sampling data to the photoacoustic image generation unit 24. In addition, the data demultiplexing unit 23 reads the sampling data of the reflected ultrasonic waves from the receiving memory 22 and transmits the sampling data to the ultrasound image generation unit 25.

The photoacoustic image generation unit 24 generates a photoacoustic image on the basis of the detection signal of the photoacoustic waves detected by the ultrasound probe 11. The generation of the photoacoustic image includes, for example, image reconfiguration, such as phasing addition, detection, and logarithmic conversion. The ultrasound image generation unit 25 generates an ultrasound image (reflected acoustic image) on the basis of the detection signal of the reflected ultrasonic waves detected by the ultrasound probe 11. The generation of the ultrasound image includes, for example, image reconfiguration, such as phasing addition, detection, and logarithmic conversion. The image output unit 26 outputs the photoacoustic image and the ultrasound image to an image display unit 30 such as a display device.

The control unit 28 controls each component in the ultrasound unit 12. For example, in a case in which a photoacoustic image is acquired, the control unit 28 transmits a trigger signal to the laser unit 13 such that the laser unit 13 emits laser light. In addition, the control unit 28 transmits a sampling trigger signal to the receiving circuit 21 to control, for example, the sampling start time of the photoacoustic waves with the emission of the laser light.

In a case in which an ultrasound image is acquired, the control unit 28 transmits an ultrasound transmission trigger signal for commanding the transmission of ultrasonic waves to the transmission control circuit 27. In a case in which the ultrasound transmission trigger signal is received, the transmission control circuit 27 directs the ultrasound probe 11 to transmit ultrasonic waves. The ultrasound probe 11 performs scanning while shifting acoustic lines one by one to detect the reflected ultrasonic waves. The control unit 28 transmits a sampling trigger signal to the receiving circuit 21 according to an ultrasound transmission time to start the sampling of the reflected ultrasonic waves.

Next, the operation of the photoacoustic image generation apparatus 10 according to this embodiment will be described. First, a photoacoustic image generation process will be described with reference to a flowchart illustrated in FIG. 3.

In the photoacoustic image generation process, image acquisition conditions, such as a frame rate, the number of laser emission operations per frame, and the balance between the numbers of frames of reflected acoustic signals and photoacoustic image signals per frame, are stored in the memory (not illustrated) of the ultrasound unit 12 in advance. In addition, the control unit 28 determines light source driving conditions, such as a laser emission time, the number of laser pulses, and a current, so as to correspond to the image acquisition conditions and uses the light source driving conditions to drive the laser unit 13.

The photoacoustic image generation process starts in a state in which the connector 72 of the optical cable 70 connected to the puncture needle 15 is connected to the laser unit 13. The control unit 28 of the ultrasound unit 12 transmits a trigger signal to the laser unit 13. In a case in which the trigger signal is received, the laser unit 13 starts laser oscillation and emits pulsed laser light (S10). The pulsed laser light emitted from the laser unit 13 is guided by the optical cable 70 and is incident on the optical fiber 14 of the puncture needle 15. Then, the pulsed laser light is guided to the vicinity of the tip of the puncture needle 15 by the optical fiber 14 in the puncture needle 15 and is emitted from the resin member 17 to the photoacoustic wave generation portion 16. The photoacoustic wave generation portion 16 absorbs the pulsed laser light and generates photoacoustic waves (S12). In addition, in the photoacoustic image generation process, a user, such as a doctor, inserts the puncture needle 15 into the subject at any time such as before or after the driving of the laser unit 13.

The ultrasound probe 11 detects the photoacoustic waves generated from the photoacoustic wave generation portion 16 irradiated with the laser light (S14). A detection signal of the photoacoustic waves output from the ultrasound probe 11 is received by the receiving circuit 21 and the sampling data of the detection signal is stored in the receiving memory 22. The photoacoustic image generation unit 24 receives the sampling data of the detection signal of the photoacoustic waves through the data demultiplexing unit 23 and generates a photoacoustic image (S16). The photoacoustic image generation unit 24 may apply a color map to convert signal intensity in the photoacoustic image into a color. The photoacoustic image generated by the photoacoustic image generation unit 24 is input to the image output unit 26 and the image output unit 26 displays the photoacoustic image on the image display unit 30 (S18).

Next, an ultrasound image generation process will be described with reference to a flowchart illustrated in FIG. 4. First, the control unit 28 transmits an ultrasound transmission trigger signal to the transmission control circuit 27 and the transmission control circuit 27 directs the ultrasound probe 11 to transmit ultrasonic waves in response to the ultrasound transmission trigger signal (S30). The ultrasound probe 11 transmits ultrasonic waves and then detects reflected ultrasonic waves (S32). Then, a detection signal of the reflected ultrasonic waves is received by the receiving circuit 21 and the sampling data of the detection signal is stored in the receiving memory 22. The ultrasound image generation unit 25 receives the sampling data of the detection signal of the ultrasonic waves through the data demultiplexing unit 23 and generates an ultrasound image (S34). The ultrasound image generation unit 25 may apply a color map to convert signal intensity in the ultrasound image into a color. The ultrasound image generated by the ultrasound image generation unit 25 is input to the image output unit 26 and the image output unit 26 displays the ultrasound image on the image display unit 30 (S36).

The image display unit 30 may display a composite image of the photoacoustic image and the ultrasound image. In this case, it is possible to check the position of the tip of the puncture needle 15 in a living body and thus to accurately perform a safe needling operation. In addition, in this embodiment, as described above, light is emitted from the hemispherical resin member 17, which makes it possible to increase the emission angle of the photoacoustic waves. Therefore, it is possible to improve the visibility of the tip of the puncture needle 15.

Next, puncture needles 15 using other embodiments of the insert according to the invention will be described.

A puncture needle 15 according to a second embodiment of the invention is the same as the puncture needle 15 according to the first embodiment illustrated in FIG. 1 in a configuration and differs from the puncture needle 15 according to the first embodiment in the material forming the resin member 17. In the puncture needle 15 according to the second embodiment, a resin having light diffusion properties is used as the material forming the resin member 17. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used. According to the puncture needle 15 of the second embodiment, since a resin having light diffusion properties is used as the material forming the resin member 17, light can be uniformly emitted from the resin member 17 at a larger angle by light diffusion in the resin member 17. Therefore, it is possible to increase the emission angle of the photoacoustic waves generated by the photoacoustic wave generation portion 16.

Next, a puncture needle 15 according to a third embodiment of the invention will be described. In the puncture needle 15 according to the first embodiment, the hemispherical resin member 17 is provided on the surface of the light emission end 14a of the optical fiber 14. However, in the puncture needle 15 according to the third embodiment, the resin member 17 is provided not only on the surface of the light emission end 14a but also on a side surface 14b in the vicinity of the tip of the optical fiber 14.

Figure 5:
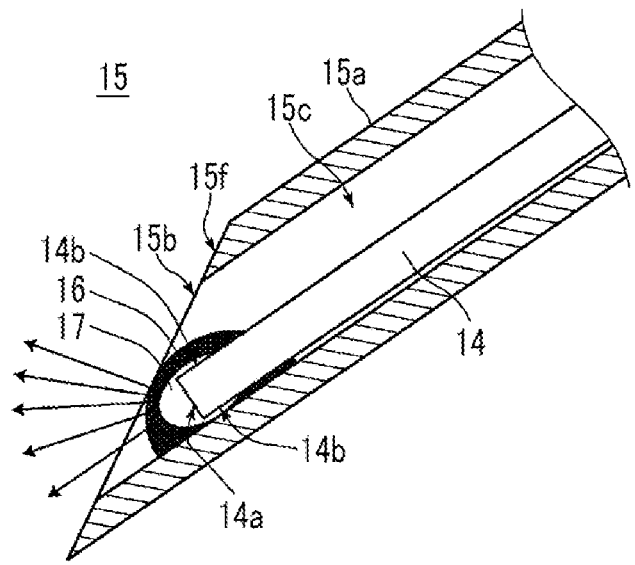
FIG. 5 is a diagram illustrating the configuration of a tip portion of a puncture needle according to third and fourth embodiments.

FIG. 5 is a cross-sectional view illustrating the puncture needle 15 according to the third embodiment. As illustrated in FIG. 5, in the puncture needle 15 according to the third embodiment, the resin member 17 is provided not only on the surface of the light emission end 14a of the optical fiber 14 but also on the side surface 14b in the vicinity of the tip of the optical fiber 14. The other configurations are the same as those in the puncture needle 15 according to the first embodiment. The resin member 17 according to the third embodiment can also be formed by dipping and pulling out the light emission end 14a of the optical fiber 14 in a case in which the material forming the resin member 17 is in a liquid state before being cured. According to the puncture needle 15 of the second embodiment, since the resin member 17 is provided up to the side surface 14b in the vicinity of the tip of the optical fiber 14, it is possible to increase the adhesion area of the resin member 17 and increase adhesion force. In addition, it is possible to protect the corners of the tip of the optical fiber 14 with the resin member 17.

Next, a puncture needle 15 according to a fourth embodiment of the invention will be described. The puncture needle 15 according to the fourth embodiment is the same as the puncture needle 15 according to the third embodiment illustrated in FIG. 5 in a configuration and differs from the puncture needle 15 according to the third embodiment in the material forming the resin member 17. In the puncture needle 15 according to the fourth embodiment, a resin having light diffusion properties is used as the material forming the resin member 17 similarly to the puncture needle 15 according to the second embodiment. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used.

Figure 6:
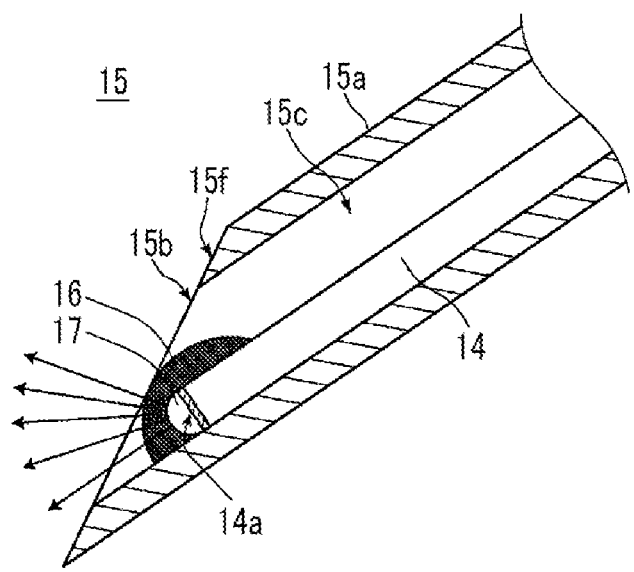
FIG. 6 is a diagram illustrating the configuration of a tip portion of a puncture needle according to fifth and sixth embodiments.

Next, a puncture needle 15 according to a fifth embodiment of the invention will be described. FIG. 6 is a cross-sectional view illustrating the puncture needle 15 according to the fifth embodiment. In the puncture needle 15 according to the fifth embodiment, a polishing process for the surface of the light emission end 14a of the optical fiber 14 is a rough polishing process. Specifically, the polishing process is performed such that the surface of the light emission end 14a of the optical fiber 14 is rougher than the surface of the light incident end of the optical fiber 14. The light incident end of the optical fiber 14 is opposite to the light emission end 14a of the optical fiber 14. In addition, the puncture needle 15 according to the fifth embodiment has the same configuration as the puncture needle 15 according to the first embodiment except the surface roughness of the light emission end 14a of the optical fiber 14 as illustrated in FIG. 6. The anchor effect obtained by the rough polished surface also contributes to the adhesion force between the resin member 17 and the optical fiber 14.

The light emission end 14a and the light incident end of the optical fiber 14 are polished using abrasive powders with different particle sizes to have different surface roughnesses. Specifically, the light emission end 14a of the optical fiber 14 is polished using, for example, abrasive powder with a particle size of 3.0 µm, 12.0 µm, or 30.0 µm for finishing. In addition, the light incident end of the optical fiber 14 is polished using abrasive powder with a particle size less than that used for the light emission end 14a of the optical fiber 14, for example, abrasive powder with a particle size of 0.3 µm or 1.0 µm.

According to the puncture needle 15 of the fifth embodiment, since the surface of the light emission end 14a of the optical fiber 14 is a rough polished surface, light can be uniformly emitted from the resin member 17 at a larger angle by the diffusion of light by the rough polished surface. Therefore, it is possible to increase the emission angle of the photoacoustic waves generated in the photoacoustic wave generation portion 16.

Next, a puncture needle 15 according to a sixth embodiment of the invention will be described. The puncture needle 15 according to the sixth embodiment is the same as the puncture needle 15 according to the fifth embodiment illustrated in FIG. 6 in a configuration and differs from the puncture needle 15 according to the fifth embodiment in the material forming the resin member 17. In the puncture needle 15 according to the sixth embodiment, a resin having light diffusion properties is used as the material forming the resin member 17 similarly to the puncture needle 15 according to the second embodiment. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used.

According to the puncture needle 15 of the sixth embodiment, since a resin having light diffusion properties is used as the material forming the resin member 17, light can be uniformly emitted from the resin member 17 at a larger angle by light diffusion in the resin member 17. Therefore, it is possible to increase the emission angle of the photoacoustic waves generated by the photoacoustic wave generation portion 16.

Figure 7:
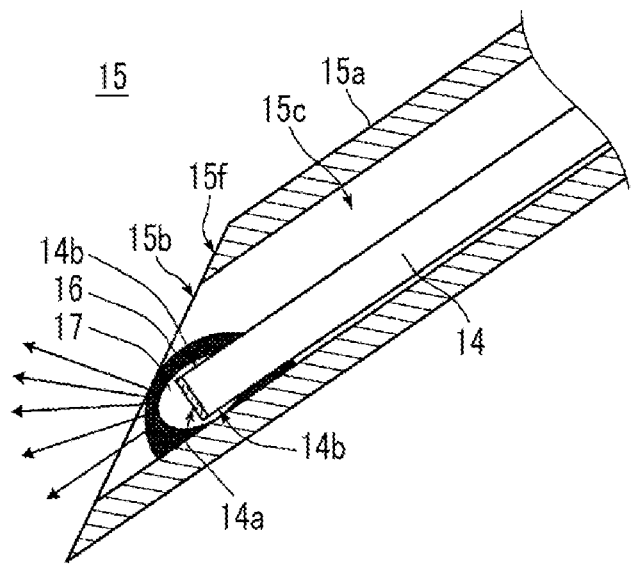
FIG. 7 is a diagram illustrating the configuration of a tip portion of a puncture needle according to seventh and eighth embodiments.

Next, a puncture needle 15 according to a seventh embodiment of the invention will be described. FIG. 7 is a cross-sectional view illustrating the puncture needle 15 according to the seventh embodiment. The puncture needle 15 according to the seventh embodiment is the same as the puncture needle 15 according to the fifth embodiment in that the polishing process is performed such that the surface of the light emission end 14a of the optical fiber 14 is rougher than the surface of the light incident end of the optical fiber 14, but differs from the puncture needle 15 according to the fifth embodiment in the range in which the resin member 17 is provided. In the puncture needle 15 according to the seventh embodiment, similarly to the puncture needle 15 according to the third embodiment, the resin member 17 is provided not only on the surface of the light emission end 14a but also on the side surface 14b in the vicinity of the tip of the optical fiber 14. The other configurations are the same as those in the puncture needle 15 according to the fifth embodiment. According to the puncture needle 15 according to the seventh embodiment, since the resin member 17 is provided up to the side surface 14b in the vicinity of the tip of the optical fiber 14, it is possible to increase the adhesion area of the resin member 17 and increase adhesion force. In addition, it is possible to protect the corners of the tip of the optical fiber 14 with the resin member 17. Further, the anchor effect obtained by the rough polished surface also contributes to the adhesion force.

Next, a puncture needle 15 according to an eighth embodiment of the invention will be described. The puncture needle 15 according to the eighth embodiment is the same as the puncture needle 15 according to the seventh embodiment illustrated in FIG. 7 in a configuration and differs from the puncture needle 15 according to the seventh embodiment in the material forming the resin member 17. In the puncture needle 15 according to the eighth embodiment, a resin having light diffusion properties is used as the material forming the resin member 17 similarly to the puncture needle 15 according to the sixth embodiment. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used.

Next, a puncture needle 15 according to a ninth embodiment of the invention will be described. In the puncture needle 15 according to the first embodiment, the photoacoustic wave generation portion 16 and the tip portion of the optical fiber 14 are fixed to the inner wall of the puncture needle main body 15a by the adhesion force of the material forming the photoacoustic wave generation portion 16 while the material forming the photoacoustic wave generation portion 16 is supplied to the light emission end 14*a* of the optical fiber 14 to form the photoacoustic wave generation portion 16. However, in the puncture needle 15 according to the ninth embodiment, the optical fiber 14 provided with the photoacoustic wave generation portion 16 is fixed to the inner wall of the puncture needle main body 15*a* by a synthetic resin which is an adhesive.

Figure 8:
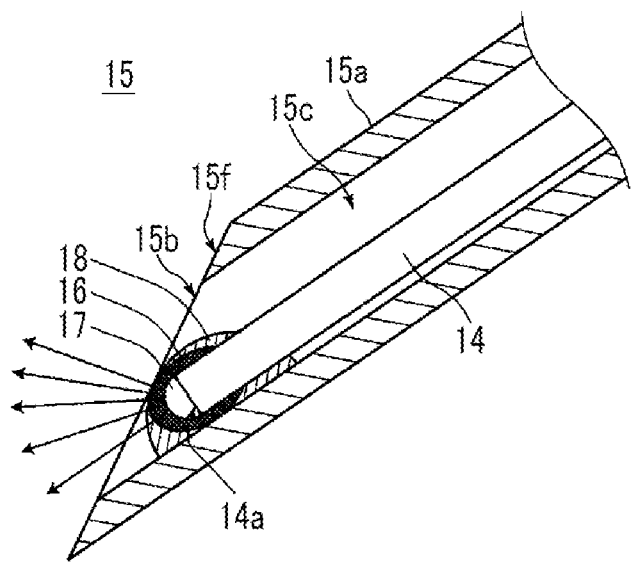
FIG. 8 is a diagram illustrating the configuration of a tip portion of a puncture needle according to ninth and tenth embodiments.

FIG. 8 is a cross-sectional view illustrating the puncture needle 15 according to the ninth embodiment. As a method for manufacturing the puncture needle 15 according to the ninth embodiment, first, the photoacoustic wave generation portion 16 is formed at the light emission end 14*a* of the optical fiber 14. Then, the optical fiber 14 provided with the photoacoustic wave generation portion 16 is inserted into the hollow portion 15*c* of the puncture needle main body 15*a* such that the photoacoustic wave generation portion 16 is disposed at a desired position. Then, an adhesive resin 18 is supplied to the photoacoustic wave generation portion 16 and is then cured. A thermosetting resin and a photocurable resin can be used as the adhesive resin 18. However, it is preferable to use the photocurable resin that is more simply processed. For example, a resin that is cured by irradiation with visible light or a resin that is cured by irradiation with ultraviolet light can be used as the photocurable resin.

In this configuration in which the optical fiber 14 provided with the photoacoustic wave generation portion 16 is inserted into the hollow portion 15*c* of the puncture needle main body 15*a* and the photoacoustic wave generation portion 16 is fixed by the adhesive resin 18, in a case in which the optical fiber 14 is inserted into the hollow portion 15*c* of the puncture needle main body 15*a*, the light emission end 14*a* of the optical fiber 14 is protected by the photoacoustic wave generation portion 16. Therefore, the light emission end 14*a* of the optical fiber 14 can be prevented from being broken by collision with an insertion hole for the optical fiber 14 in the puncture needle main body 15*a* or the inner wall of the puncture needle main body 15*a*.

The other configurations of the puncture needle 15 according to the ninth embodiment including, for example, the resin member 17 are the same as those in the puncture needle 15 according to the first embodiment. In addition, the optical fiber 14 provided with the photoacoustic wave generation portion 16 may be disposed in the vicinity of the opening 15*b* of the puncture needle 15 without using the adhesive resin 18.

Next, a puncture needle 15 according to a tenth embodiment of the invention will be described. The puncture needle 15 according to the tenth embodiment is the same as the puncture needle 15 according to the ninth embodiment illustrated in FIG. 8 in a configuration and differs from the puncture needle 15 according to the ninth embodiment in the material forming the resin member 17. In the puncture needle 15 according to the tenth embodiment, a resin having light diffusion properties is used as the material forming the resin member 17. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used. In addition, the optical fiber 14 provided with the photoacoustic wave generation portion 16 may be disposed in the vicinity of the opening 15*b* of the puncture needle 15 without using the adhesive resin 18.

Next, a puncture needle 15 according to an eleventh embodiment of the invention will be described. The puncture needle 15 according to the eleventh embodiment differs from the puncture needle 15 according to the ninth embodiment in the range in which the resin member 17 is provided. In the puncture needle 15 according to the eleventh embodiment, the resin member 17 is provided not only on the surface of the light emission end 14*a* but also on the side surface 14*b* in the vicinity of the tip of the optical fiber 14.

Figure 9:
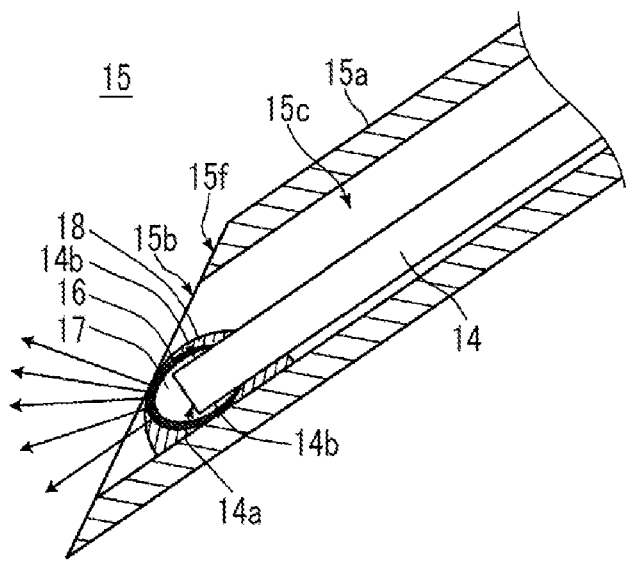
FIG. 9 is a diagram illustrating the configuration of a tip portion of a puncture needle according to eleventh and twelfth embodiments.

FIG. 9 is a cross-sectional view illustrating the puncture needle 15 according to the eleventh embodiment. As illustrated in FIG. 9, in the puncture needle 15 according to the eleventh embodiment, the resin member 17 is provided not only on the surface of the light emission end 14*a* of the optical fiber 14 but also on the side surface 14*b* in the vicinity of the tip of the optical fiber 14. The other configurations are the same as those in the puncture needle 15 according to the ninth embodiment. According to the puncture needle 15 of the eleventh embodiment, since the resin member 17 is provided up to the side surface 14*b* in the vicinity of the tip of the optical fiber 14, it is possible to increase the adhesion area of the resin member 17 and increase adhesion force. In addition, it is possible to protect the corners of the tip of the optical fiber 14 with the resin member 17. Further, the optical fiber 14 provided with the photoacoustic wave generation portion 16 may be disposed in the vicinity of the opening 15*b* of the puncture needle 15 without using the adhesive resin 18.

Next, a puncture needle 15 according to a twelfth embodiment of the invention will be described. The puncture needle 15 according to the twelfth embodiment is the same as the puncture needle 15 according to the eleventh embodiment illustrated in FIG. 9 in a configuration and differs from the puncture needle 15 according to the eleventh embodiment in the material forming the resin member 17. In the puncture needle 15 according to the twelfth embodiment, a resin having light diffusion properties is used as the material forming the resin member 17 similarly to the puncture needle 15 according to the tenth embodiment. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used. In addition, the optical fiber 14 provided with the photoacoustic wave generation portion 16 may be disposed in the vicinity of the opening 15*b* of the puncture needle 15 without using the adhesive resin 18.

Figure 10:
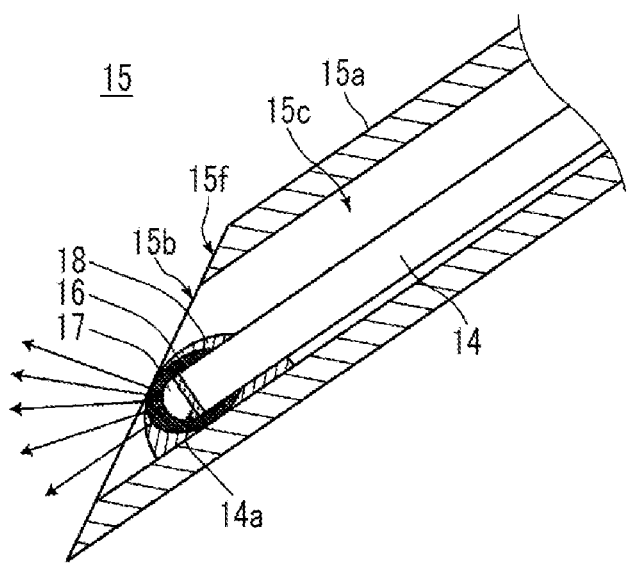
FIG. 10 is a diagram illustrating the configuration of a tip portion of a puncture needle according to thirteenth and fourteenth embodiments.

Next, a puncture needle 15 according to a thirteenth embodiment of the invention will be described. FIG. 10 is a cross-sectional view illustrating the puncture needle 15 according to the thirteenth embodiment. The puncture needle 15 according to the thirteenth embodiment differs from the puncture needle 15 according to the ninth embodiment illustrated in FIG. 8 in that a polishing process for the surface of the light emission end 14*a* of the optical fiber 14 is a rough polishing process. Specifically, the polishing process is performed such that the surface of the light emission end 14*a* of the optical fiber 14 is rougher than the surface of the light incident end of the optical fiber 14. The light incident end of the optical fiber 14 is opposite to the light emission end 14a of the optical fiber 14. In addition, the puncture needle 15 according to the thirteenth embodiment has the same configuration as the puncture needle 15 according to the ninth embodiment except the surface roughness of the light emission end 14a of the optical fiber 14 as illustrated in FIG. 10.

A method for performing the polishing process for the light emission end 14a and the light incident end of the optical fiber 14 is the same as that in the puncture needle 15 according to the fifth embodiment.

According to the puncture needle 15 of the thirteenth embodiment, since the surface of the light emission end 14a of the optical fiber 14 is a rough polished surface, light can be uniformly emitted from the resin member 17 at a larger angle by the diffusion of light by the rough polished surface. Therefore, it is possible to increase the emission angle of the photoacoustic waves generated in the photoacoustic wave generation portion 16. In addition, the optical fiber 14 provided with the photoacoustic wave generation portion 16 may be disposed in the vicinity of the opening 15b of the puncture needle 15 without using the adhesive resin 18.

Next, a puncture needle 15 according to a fourteenth embodiment of the invention will be described. The puncture needle 15 according to the fourteenth embodiment is the same as the puncture needle 15 according to the thirteenth embodiment illustrated in FIG. 10 in a configuration and differs from the puncture needle 15 according to the thirteenth embodiment in the material forming the resin member 17. In the puncture needle 15 according to the fourteenth embodiment, a resin having light diffusion properties is used as the material forming the resin member 17 similarly to the puncture needle 15 according to the second embodiment. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used. According to the puncture needle 15 of the fourteenth embodiment, since a resin having light diffusion properties is used as the material forming the resin member 17, light can be uniformly emitted from the resin member 17 at a larger angle by light diffusion in the resin member 17. Therefore, it is possible to increase the emission angle of the photoacoustic waves generated by the photoacoustic wave generation portion 16. In addition, the optical fiber 14 provided with the photoacoustic wave generation portion 16 may be disposed in the vicinity of the opening 15b of the puncture needle 15 without using the adhesive resin 18.

Figure 11:
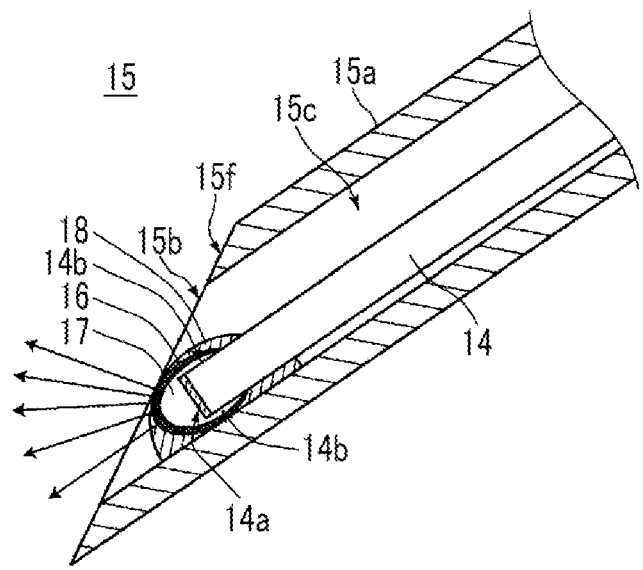
FIG. 11 is a diagram illustrating the configuration of a tip portion of a puncture needle according to fifteenth and sixteenth embodiments.

Next, a puncture needle 15 according to a fifteenth embodiment of the invention will be described. FIG. 11 is a cross-sectional view illustrating the puncture needle 15 according to the fifteenth embodiment. In the puncture needle 15 according to the fifteenth embodiment, the resin member 17 is provided not only on the surface of the light emission end 14a of the optical fiber 14 but also on the side surface 14b in the vicinity of the tip of the optical fiber 14. The other configurations are the same as those in the puncture needle 15 according to the thirteenth embodiment. According to the puncture needle 15 of the fifteenth embodiment, since the resin member 17 is provided up to the side surface 14b in the vicinity of the tip of the optical fiber 14, it is possible to increase the adhesion area of the resin member 17 and increase adhesion force. In addition, it is possible to protect the corners of the tip of the optical fiber 14 with the resin member 17. In addition, the optical fiber 14 provided with the photoacoustic wave generation portion 16 may be disposed in the vicinity of the opening 15b of the puncture needle 15 without using the adhesive resin 18.

Next, a puncture needle 15 according to a sixteenth embodiment of the invention will be described. The puncture needle 15 according to the sixteenth embodiment is the same as the puncture needle 15 according to the fifteenth embodiment illustrated in FIG. 11 in a configuration and differs from the puncture needle 15 according to the fifteenth embodiment in the material forming the resin member 17. In the puncture needle 15 according to the sixteenth embodiment, a resin having light diffusion properties is used as the material forming the resin member 17 similarly to the puncture needle 15 according to the fourteenth embodiment. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used. In addition, the optical fiber 14 provided with the photoacoustic wave generation portion 16 may be disposed in the vicinity of the opening 15b of the puncture needle 15 without using the adhesive resin 18.

Figure 12:
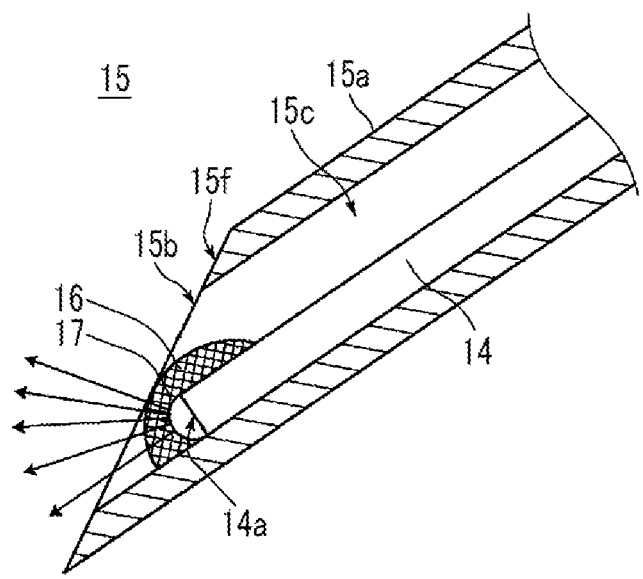
FIG. 12 is a diagram illustrating the configuration of a tip portion of a puncture needle according to seventeenth and eighteenth embodiments.

Next, a puncture needle 15 according to a seventeenth embodiment of the invention will be described. FIG. 12 is a cross-sectional view illustrating the puncture needle 15 according to the seventeenth embodiment. The puncture needle 15 according to the seventeenth embodiment is the same as the puncture needle 15 according to the first embodiment illustrated in FIG. 1 in a configuration and differs from the puncture needle 15 according to the first embodiment in the material forming the photoacoustic wave generation portion 16. The other configurations are the same as those in the puncture needle 15 according to the first embodiment.

For example, in a case in which near-infrared light is used as the laser light guided by the optical fiber 14, an ultraviolet-curable resin or a photocurable resin including a pigment that absorbs near-infrared light and has high transmittance with respect to light with a wavelength from ultraviolet to blue is used as the material forming the photoacoustic wave generation portion 16 of the puncture needle 15 according to the seventeenth embodiment.

Figure 13:
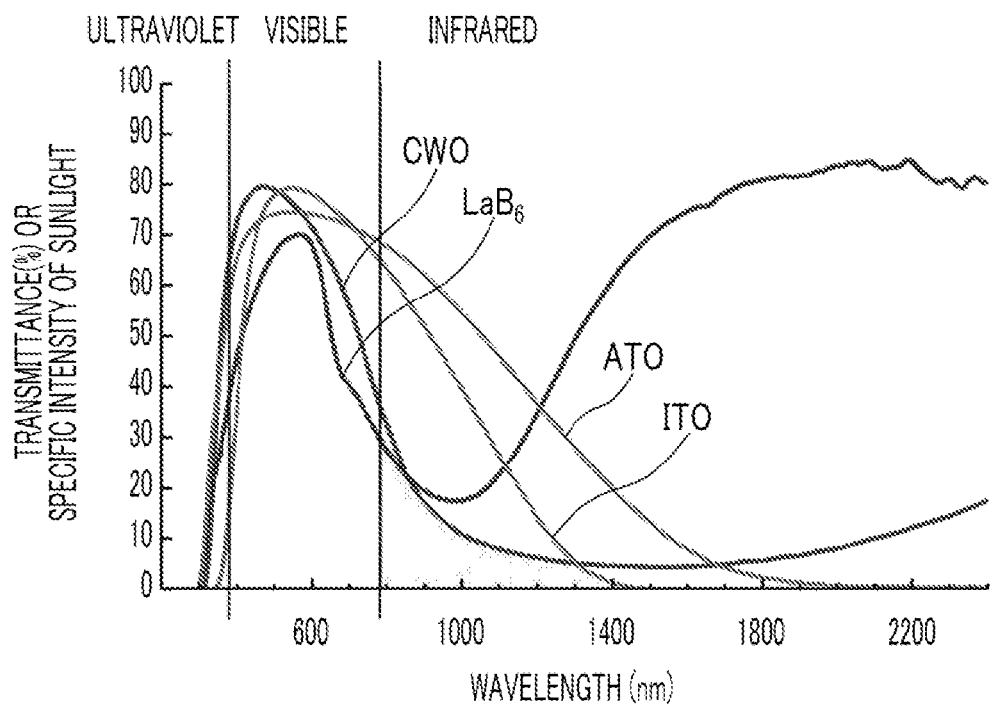
FIG. 13 is a diagram illustrating the light transmission characteristics of CWO, $LaB_6$, ATO, and ITO.
Figure 14:
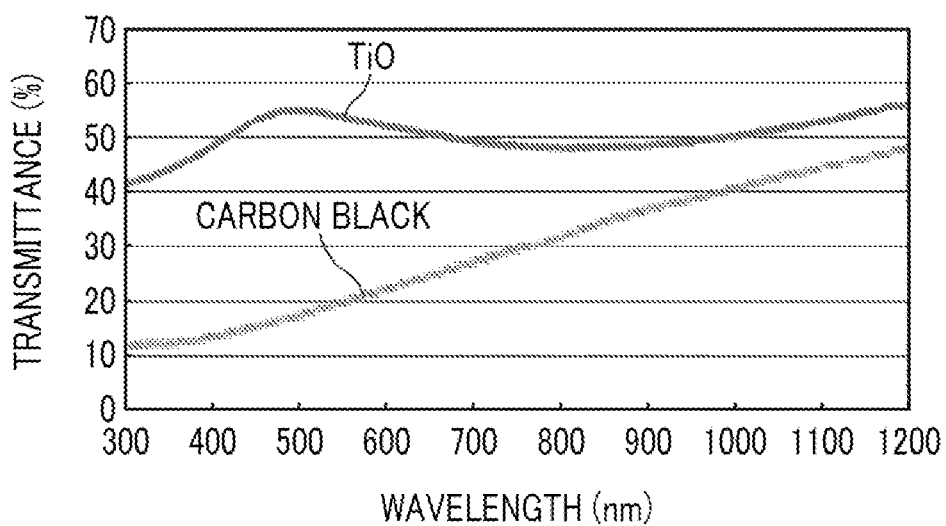
FIG. 14 is a diagram illustrating the light transmission characteristics of TiO and carbon black.

Examples of the pigment that absorbs near-infrared light and has high transmittance with respect to light with a wavelength from ultraviolet to blue include cesium tungsten oxide (CWO), lanthanum hexaboride ($LaB_6$), antimony tin oxide (ATO), and indium tin oxide (ITO). FIG. 13 is a diagram illustrating the light transmission characteristics of CWO, $LaB_6$, ATO, and ITO. In addition, titanium black, such as titanium oxide (TiO), may be used. FIG. 14 is a diagram illustrating the light transmission characteristics of TiO. FIG. 14 also illustrates the light transmission characteristics of carbon black for comparison. The high transmittance with respect to light with a wavelength from ultraviolet to blue may be 10% or more with respect to at least a part of the wavelength range from ultraviolet to blue. In addition, the light transmittance can be controlled by changing the mixture concentration of the pigment with the resin. The resin can be applied onto a slide glass with the same thickness as that applied to the optical fiber 14 and the transmittance of the resin can be measured by, for example, a spectrophotometer and can be determined. In addition, the amount of incident light and the incident time of light with a wavelength from ultraviolet to blue can be changed as the curing conditions. Therefore, for the material, the absorbance of near-infrared light and transmittance at the curing wavelength may be balanced.

As such, the use of the above-mentioned material as the material forming the photoacoustic wave generation portion 16 makes it possible to effectively cure an ultraviolet-curable resin or a photocurable resin in the process of forming the photoacoustic wave generation portion 16.

Next, a puncture needle 15 according to an eighteenth embodiment of the invention will be described. The puncture needle 15 according to the eighteenth embodiment is the same as the puncture needle 15 according to the seventeenth embodiment illustrated in FIG. 12 in a configuration and differs from the puncture needle 15 according to the seventeenth embodiment in the material forming the resin member 17. In the puncture needle 15 according to the eighteenth embodiment, a resin having light diffusion properties is used as the material forming the resin member 17. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used.

Next, a puncture needle 15 according to a nineteenth embodiment of the invention will be described. The puncture needle 15 according to the nineteenth embodiment differs from the puncture needle 15 according to the seventeenth embodiment in the range in which the resin member 17 is provided. In the puncture needle 15 according to the nineteenth embodiment, the resin member 17 is provided not only on the surface of the light emission end 14*a* but also on the side surface 14*b* in the vicinity of the tip of the optical fiber 14.

Figure 15:
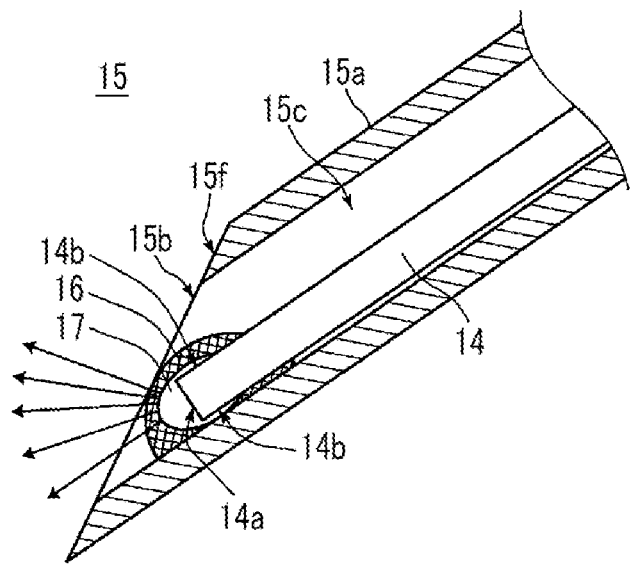
FIG. 15 is a diagram illustrating the configuration of a tip portion of a puncture needle according to nineteenth and twentieth embodiments.

FIG. 15 is a cross-sectional view illustrating the puncture needle 15 according to the nineteenth embodiment. As illustrated in FIG. 15, in the puncture needle 15 according to the nineteenth embodiment, the resin member 17 is provided not only on the surface of the light emission end 14*a* of the optical fiber 14 but also on the side surface 14*b* in the vicinity of the tip of the optical fiber 14. The other configurations are the same as those in the puncture needle 15 according to the seventeenth embodiment. According to the puncture needle 15 of the nineteenth embodiment, since the resin member 17 is provided up to the side surface 14*b* in the vicinity of the tip of the optical fiber 14, it is possible to increase the adhesion area of the resin member 17 and increase adhesion force. In addition, it is possible to protect the corners of the tip of the optical fiber 14 with the resin member 17.

Next, a puncture needle 15 according to a twentieth embodiment of the invention will be described. The puncture needle 15 according to the twentieth embodiment is the same as the puncture needle 15 according to the nineteenth embodiment illustrated in FIG. 15 in a configuration and differs from the puncture needle 15 according to the nineteenth embodiment in the material forming the resin member 17. In the puncture needle 15 according to the twentieth embodiment, a resin having light diffusion properties is used as the material forming the resin member 17 similarly to the puncture needle 15 according to the eighteenth embodiment. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used.

Figure 16:
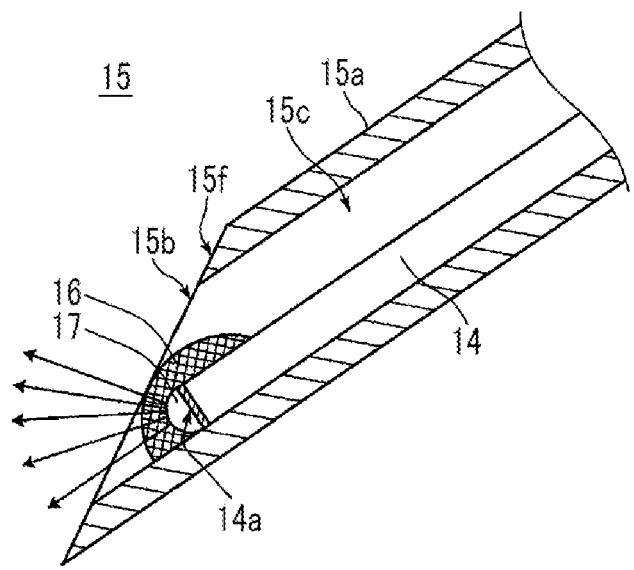
FIG. 16 is a diagram illustrating the configuration of a tip portion of a puncture needle according to twenty-first and twenty-second embodiments.

Next, a puncture needle 15 according to a twenty-first embodiment of the invention will be described. FIG. 16 is a cross-sectional view illustrating the puncture needle 15 according to the twenty-first embodiment. In the puncture needle 15 according to the twenty-first embodiment, a polishing process for the surface of the light emission end 14*a* of the optical fiber 14 is a rough polishing process. Specifically, the polishing process is performed such that the surface of the light emission end 14*a* of the optical fiber 14 is rougher than the surface of the light incident end of the optical fiber 14. The light incident end of the optical fiber 14 is opposite to the light emission end 14*a* of the optical fiber 14. In addition, the puncture needle 15 according to the twenty-first embodiment has the same configuration as the puncture needle 15 according to the seventeenth embodiment illustrated in FIG. 12 except the surface roughness of the light emission end 14*a* of the optical fiber 14 as illustrated in FIG. 16.

A method for performing the polishing process for the light emission end 14*a* and the light incident end of the optical fiber 14 is the same as that in the puncture needle 15 according to the fifth embodiment.

According to the puncture needle 15 of the twenty-first embodiment, since the surface of the light emission end 14*a* of the optical fiber 14 is a rough polished surface, light can be uniformly emitted from the resin member 17 at a larger angle by the diffusion of light by the rough polished surface. Therefore, it is possible to increase the emission angle of the photoacoustic waves generated in the photoacoustic wave generation portion 16.

Next, a puncture needle 15 according to a twenty-second embodiment of the invention will be described. The puncture needle 15 according to the twenty-second embodiment is the same as the puncture needle 15 according to the twenty-first embodiment illustrated in FIG. 16 in a configuration and differs from the puncture needle 15 according to the twenty-first embodiment in the material forming the resin member 17. In the puncture needle 15 according to the twenty-second embodiment, a resin having light diffusion properties is used as the material forming the resin member 17 similarly to the puncture needle 15 according to the twentieth embodiment. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used.

Figure 17:
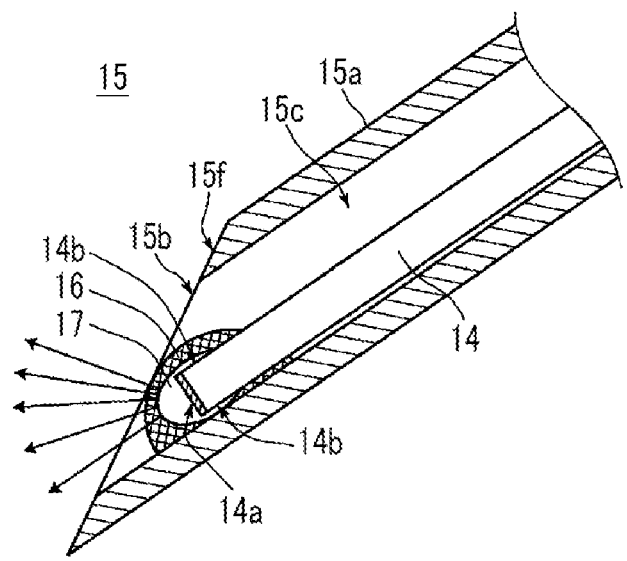
FIG. 17 is a diagram illustrating the configuration of a tip portion of a puncture needle according to twenty-third and twenty-fourth embodiments.

Next, a puncture needle 15 according to a twenty-third embodiment of the invention will be described. FIG. 17 is a cross-sectional view illustrating the puncture needle 15 according to the twenty-third embodiment. The puncture needle 15 according to the twenty-third embodiment is the same as the puncture needle 15 according to the twenty-first embodiment in that a polishing process is performed such that the surface of the light emission end 14a of the optical fiber 14 is rougher than the surface of the light incident end of the optical fiber 14 and differs from the puncture needle 15 according to the twenty-first embodiment in the range in which the resin member 17 is provided. In the puncture needle 15 according to the twenty-third embodiment, the resin member 17 is provided not only on the surface of the light emission end 14a of the optical fiber 14 but also on the side surface 14b in the vicinity of the tip of the optical fiber 14. The other configurations are the same as those in the puncture needle 15 according to the twenty-first embodiment. According to the puncture needle 15 of the twenty-third embodiment, since the resin member 17 is provided up to the side surface 14b in the vicinity of the tip of the optical fiber 14, it is possible to increase the adhesion area of the resin member 17 and increase adhesion force. In addition, it is possible to protect the corners of the tip of the optical fiber 14 with the resin member 17. The anchor effect obtained by the rough polished surface also contributes to the adhesion force.

Next, a puncture needle 15 according to a twenty-fourth embodiment of the invention will be described. The puncture needle 15 according to the twenty-fourth embodiment is the same as the puncture needle 15 according to the twenty-third embodiment illustrated in FIG. 17 in a configuration and differs from the puncture needle 15 according to the twenty-third embodiment in the material forming the resin member 17. In the puncture needle 15 according to the twenty-fourth embodiment, a resin having light diffusion properties is used as the material forming the resin member 17 similarly to the puncture needle 15 according to the twenty-second embodiment. For example, a resin including a molecule that imparts light diffusion properties can be used as the resin having light diffusion properties. Specifically, a resin that has been clouded due to the non-uniformity of a molecular structure can be used. For example, OG198-55 (manufactured by Epoxy Technology, Inc.) which is an ultraviolet-curable resin can be used as the resin. Further, for example, a thermosetting epoxy resin or an ultraviolet-curable resin mixed with a pigment, such as white titanium oxide or zirconium oxide, can be used.

In the puncture needles 15 according to the seventeenth to twenty-fourth embodiments, an ultraviolet-curable resin or a photocurable resin including a pigment that absorbs near-infrared light and has high transmittance with respect to light with a wavelength from ultraviolet to blue is used as the material forming the photoacoustic wave generation portion 16. However, the invention is not limited thereto. For example, a thermosetting resin including a pigment that absorbs near-infrared light and transmits visible light may be used. The transmission of visible light may be a transmittance of 10% or more respect to at least a part of the wavelength range of visible light. Examples of the pigment that absorbs near-infrared light and transmits visible light include cesium tungsten oxide (CWO), lanthanum hexaboride ($LaB_6$), antimony tin oxide (ATO), indium tin oxide (ITO), and titanium black such as titanium oxide (TiO).

In the puncture needle 15 according to the first to twenty-fourth embodiments, the resin member 17 is not limited to the hemispherical shape and may be formed in shapes having other curvatures. The resin member 17 may be formed in a spherical shape, an elliptical shape, or a conical shape that has curvature in a tip portion.

Figure 18:
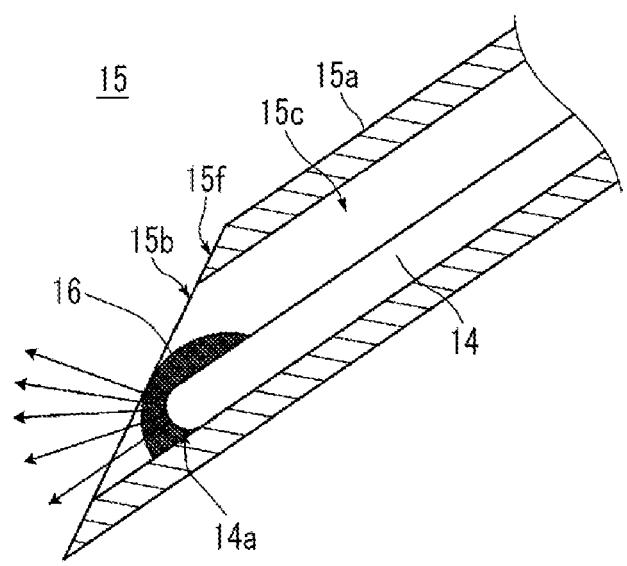
FIG. 18 is a diagram illustrating the configuration of a tip portion of a puncture needle according to a twenty-fifth embodiment.

Next, a puncture needle 15 according to a twenty-fifth embodiment of the invention will be described. In the puncture needle 15 according to the first to twenty-fourth embodiments, the resin member 17 with a shape having curvature is provided at the light emission end 14a of the optical fiber 14. However, the invention is not limited thereto. For example, the light emission end 14a of the optical fiber 14 may be polished into a shape having curvature. FIG. 18 is a cross-sectional view illustrating the puncture needle 15 according to the twenty-fifth embodiment.

In the puncture needle 15 according to the twenty-fifth embodiment, as illustrated in FIG. 18, the light emission end 14a of the optical fiber 14 is polished into a hemispherical shape. Then, the photoacoustic wave generation portion 16 is formed so as to cover the light emission end 14a polished into the hemispherical shape and the vicinity of the tip of the optical fiber 14. The other configurations are the same as those in the puncture needle 15 according to the first embodiment.

Light guided by the optical fiber 14 is emitted from the entire light emission end 14a having a hemispherical surface. Then, the light emitted from the entire surface of the hemispherical light emission end 14a is incident on the photoacoustic wave generation portion 16. Therefore, it is possible to increase the emission angle of the photoacoustic waves as represented by an arrow in FIG. 18. As a result, it is possible to improve the photoacoustic wave detection sensitivity of the ultrasound probe 11 and to suppress the generation of artifacts.

Figure 19:
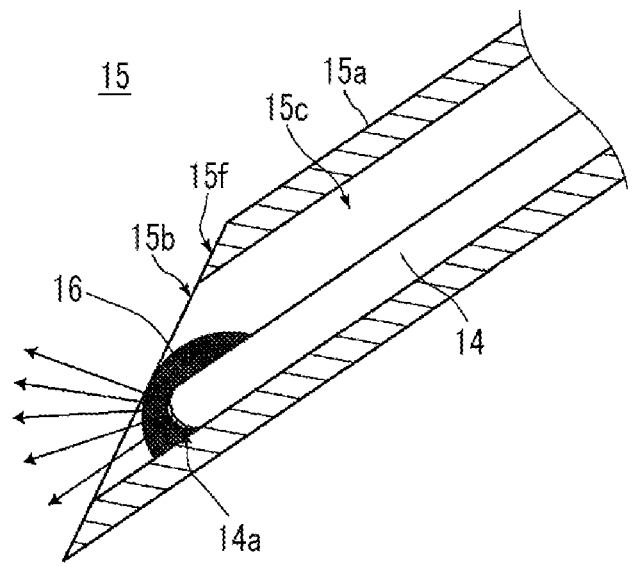
FIG. 19 is a diagram illustrating the configuration of a tip portion of a puncture needle according to a twenty-sixth embodiment.

Next, a puncture needle 15 according to a twenty-sixth embodiment of the invention will be described. FIG. 19 is a cross-sectional view illustrating the puncture needle 15 according to the twenty-sixth embodiment.

In the puncture needle 15 according to the twenty-sixth embodiment, a polishing process for the surface of the light emission end 14a of the optical fiber 14 is a rough polishing process. Specifically, the polishing process is performed such that the surface of the light emission end 14a of the optical fiber 14 is rougher than the surface of the light incident end of the optical fiber 14. The light incident end of the optical fiber 14 is opposite to the light emission end 14a of the optical fiber 14. In addition, the puncture needle 15 according to the twenty-sixth embodiment has the same configuration as the puncture needle 15 according to the twenty-fifth embodiment except the surface roughness of the light emission end 14a of the optical fiber 14 as illustrated in FIG. 19. That is, the light emission end 14a of the optical fiber 14 has a hemispherical shape.

A method for performing the polishing process for the light emission end 14a and the light incident end of the optical fiber 14 is the same as that in the puncture needle 15 according to the fifth embodiment.

According to the puncture needle 15 of the twenty-sixth embodiment, since the surface of the light emission end 14a of the optical fiber 14 is a rough polished surface, light can be uniformly emitted from the light emission end 14a at a larger angle by the diffusion of light by the rough polished surface. Therefore, it is possible to increase the emission angle of the photoacoustic waves generated in the photoacoustic wave generation portion 16.

Figure 20:
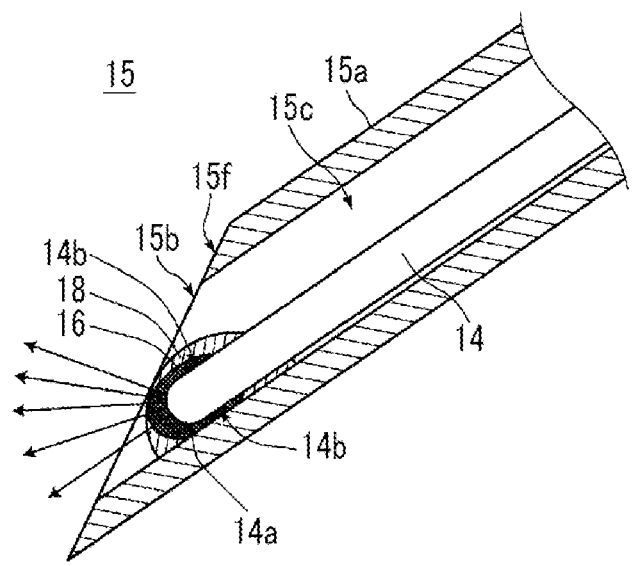
FIG. 20 is a diagram illustrating the configuration of a tip portion of a puncture needle according to a twenty-seventh embodiment.

Next, a puncture needle 15 according to a twenty-seventh embodiment of the invention will be described. FIG. 20 is a cross-sectional view illustrating the puncture needle 15 according to the twenty-seventh embodiment.

In the puncture needle 15 according to the twenty-fifth embodiment, the photoacoustic wave generation portion 16 and the tip portion of the optical fiber 14 are fixed to the inner wall of the puncture needle main body 15a by the adhesion force of the material forming the photoacoustic wave generation portion 16 while the material forming the photoacoustic wave generation portion 16 is supplied to the light emission end 14a of the optical fiber 14 to form the photoacoustic wave generation portion 16. In contrast, in the puncture needle 15 according to the twenty-seventh embodiment, the optical fiber 14 provided with the photoacoustic wave generation portion 16 is fixed to the inner wall of the puncture needle main body 15a by a synthetic resin which is an adhesive.

As a method for manufacturing the puncture needle 15 according to the twenty-seventh embodiment, first, the photoacoustic wave generation portion 16 is formed at the light emission end 14a of the optical fiber 14. Then, the optical fiber 14 provided with the photoacoustic wave generation portion 16 is inserted into the hollow portion 15c of the puncture needle main body 15a such that the photoacoustic wave generation portion 16 is disposed at a desired position. Then, the adhesive resin 18 is supplied to the photoacoustic wave generation portion 16 and is then cured. A thermosetting resin and a photocurable resin can be used as the adhesive resin 18. However, it is preferable to use the photocurable resin that is more simply processed. For example, a resin that is cured by irradiation with visible light or a resin that is cured by irradiation with ultraviolet light can be used as the photocurable resin.

In this configuration in which the optical fiber 14 provided with the photoacoustic wave generation portion 16 is inserted into the hollow portion 15c of the puncture needle main body 15a and the photoacoustic wave generation portion 16 is fixed by the adhesive resin 18, in a case in which the optical fiber 14 is inserted into the hollow portion 15c of the puncture needle main body 15a, the light emission end 14a of the optical fiber 14 is protected by the photoacoustic wave generation portion 16. Therefore, the light emission end 14a of the optical fiber 14 can be prevented from being broken by collision with an insertion hole for the optical fiber 14 in the puncture needle main body 15a or the inner wall of the puncture needle main body 15a.

The other configurations of the puncture needle 15 according to the twenty-seventh embodiment are the same as those in the puncture needle 15 according to the twenty-fifth embodiment. In addition, the optical fiber 14 provided with the photoacoustic wave generation portion 16 may be disposed in the vicinity of the opening 15b of the puncture needle 15 without using the adhesive resin 18.

Figure 21:
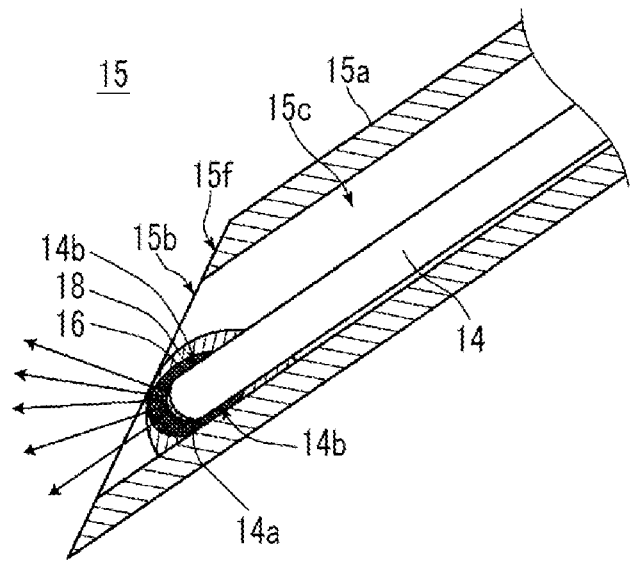
FIG. 21 is a diagram illustrating the configuration of a tip portion of a puncture needle according to a twenty-eighth embodiment.

Next, a puncture needle 15 according to a twenty-eighth embodiment of the invention will be described. FIG. 21 is a cross-sectional view illustrating the puncture needle 15 according to the twenty-eighth embodiment.

In the puncture needle 15 according to the twenty-eighth embodiment, a polishing process is performed such that the surface of the light emission end 14a of the optical fiber 14 is rougher than the surface of the light incident end of the optical fiber 14, similarly to the puncture needle 15 according to the twenty-sixth embodiment. In addition, similarly to the puncture needle 15 according to the twenty-seventh embodiment, the optical fiber 14 provided with the photoacoustic wave generation portion 16 is fixed to the inner wall of the puncture needle main body 15a by the adhesive resin 18. The other configurations are the same as those in the puncture needle 15 according to the twenty-fifth embodiment. In addition, the optical fiber 14 provided with the photoacoustic wave generation portion 16 may be disposed in the vicinity of the opening 15b of the puncture needle 15 without using the adhesive resin 18.

Figure 22:
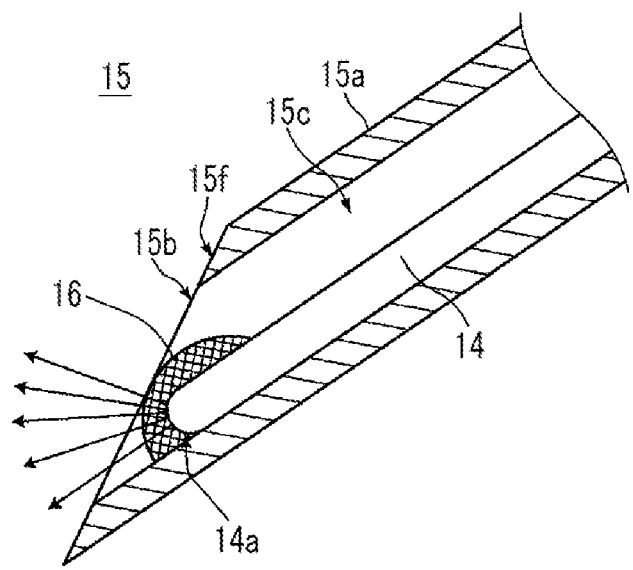
FIG. 22 is a diagram illustrating the configuration of a tip portion of a puncture needle according to a twenty-ninth embodiment.

Next, a puncture needle 15 according to a twenty-ninth embodiment of the invention will be described. FIG. 22 is a cross-sectional view illustrating the puncture needle 15 according to the twenty-ninth embodiment. The puncture needle 15 according to the twenty-ninth embodiment is the same as the puncture needle 15 according to the twenty-fifth embodiment illustrated in FIG. 18 in a configuration and differs from the puncture needle 15 according to the twenty-fifth embodiment in the material forming the photoacoustic wave generation portion 16. The other configurations are the same as those in the puncture needle 15 according to the twenty-fifth embodiment.

For example, in a case in which near-infrared light is used as the laser light guided by the optical fiber 14, an ultraviolet-curable resin or a photocurable resin including a pigment that absorbs near-infrared light and has high transmittance with respect to light with a wavelength from ultraviolet to blue is used as the material forming the photoacoustic wave generation portion 16 of the puncture needle 15 according to the twenty-ninth embodiment.

Examples of the pigment that absorbs near-infrared light and has high transmittance with respect to light with a wavelength from ultraviolet to blue include cesium tungsten oxide (CWO), lanthanum hexaboride ($LaB_6$), antimony tin oxide (ATO), indium tin oxide (ITO), and titanium black such as titanium oxide (TiO).

As such, the use of the above-mentioned material as the material forming the photoacoustic wave generation portion 16 makes it possible to effectively cure an ultraviolet-curable resin or a photocurable resin in the process of forming the photoacoustic wave generation portion 16.

In the puncture needle 15 according to the twenty-ninth embodiment, an ultraviolet-curable resin or a photocurable resin including a pigment that absorbs near-infrared light and has high transmittance with respect to light with a wavelength from ultraviolet to blue is used as the material forming the photoacoustic wave generation portion 16. However, the invention is not limited thereto. For example, a thermosetting resin including a pigment that absorbs near-infrared light and transmits visible light may be used. The transmission of visible light may be a transmittance of 10% or more with respect to at least a part of the wavelength range of visible light. Examples of the pigment that absorbs near-infrared light and transmits visible light include cesium tungsten oxide (CWO), lanthanum hexaboride ($LaB_6$), antimony tin oxide (ATO), indium tin oxide (ITO), and titanium black such as titanium oxide (TiO).

Figure 23:
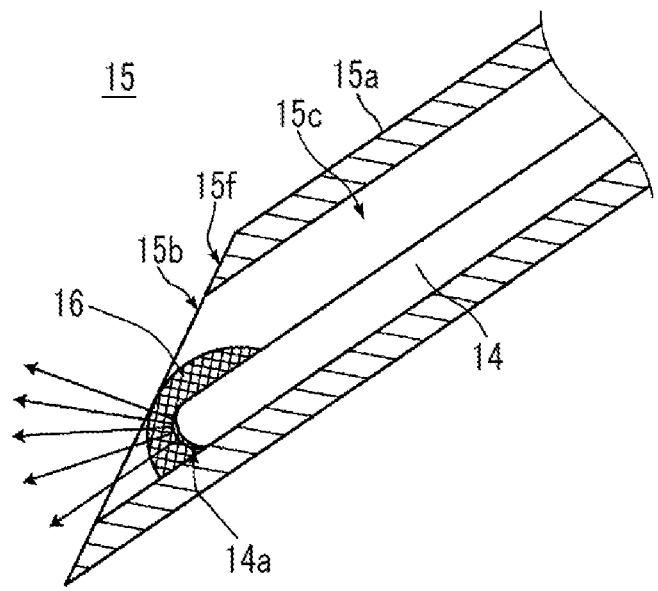
FIG. 23 is a diagram illustrating the configuration of a tip portion of a puncture needle according to a thirtieth embodiment.

Next, a puncture needle 15 according to a thirtieth embodiment of the invention will be described. FIG. 23 is a cross-sectional view illustrating the puncture needle 15 according to the thirtieth embodiment.

In the puncture needle 15 according to the thirtieth embodiment, a polishing process is performed such that the surface of the light emission end 14a of the optical fiber 14 is rougher than the surface of the light incident end of the optical fiber 14. The light incident end of the optical fiber 14 is opposite to the light emission end 14a of the optical fiber 14. In addition, the puncture needle 15 according to the thirtieth embodiment has the same configuration as the puncture needle 15 according to the twenty-ninth embodiment except the surface roughness of the light emission end 14a of the optical fiber 14 as illustrated in FIG. 23. That is, the light emission end 14a of the optical fiber 14 has a hemispherical shape and an ultraviolet-curable resin or a photocurable resin including a pigment that absorbs near-infrared light and has high transmittance with respect to light with a wavelength from ultraviolet to blue is used as the material forming the photoacoustic wave generation portion 16.

In the puncture needle 15 according to the twenty-fifth to thirtieth embodiments, the light emission end 14a of the optical fiber 14 is not limited to the hemispherical shape and may be formed in shapes having other curvatures. For example, the light emission end 14a may be formed in a conical shape that has curvature in a tip portion.

Figure 24:
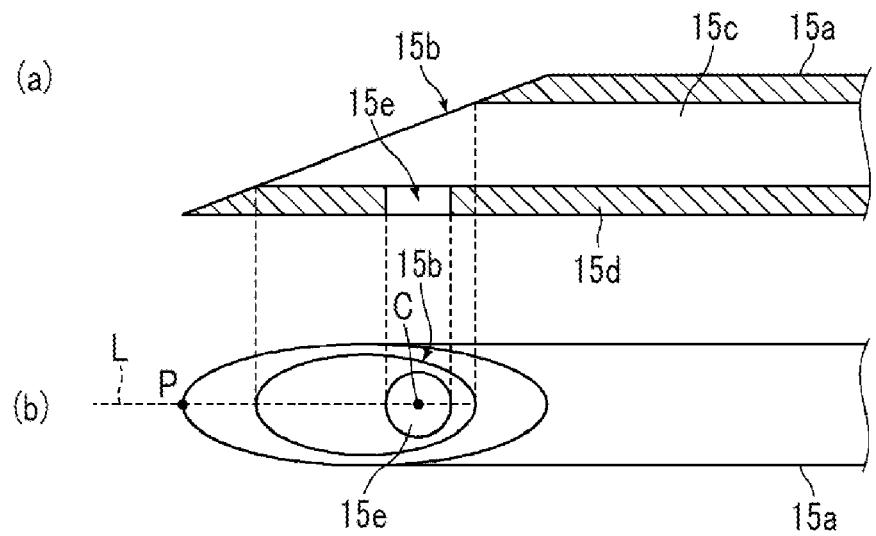
FIG. 24 is a diagram illustrating the configuration of a tip portion of a puncture needle main body in a puncture needle according to a thirty-first embodiment.

Next, a puncture needle 15 according to a thirty-first embodiment of the invention will be described. FIG. 24 is a diagram illustrating the configuration of the vicinity of the tip of a puncture needle main body 15a of the puncture needle 15 according to the thirty-first embodiment. (a) of FIG. 24 is a cross-sectional view including a central axis that extends in a length direction of the puncture needle main body 15a and (b) of FIG. 24 is a top view in a case in which an opening 15b of the puncture needle main body 15a faces upward. As illustrated in (a) and (b) of FIG. 24, a through-hole 15e is formed in a wall portion 15d forming a hollow portion 15c of the puncture needle main body 15a according to the thirty-first embodiment.

The through-hole 15e is a hole that passes from the hollow portion 15c of the puncture needle main body 15a to the outside of the puncture needle main body 15a and is preferably formed by high-precision laser machining. In this embodiment, the through-hole 15e is formed in a circular shape. The diameter of the through-hole 15e is preferably greater than the diameter of the optical fiber in terms of the propagation efficiency of photoacoustic waves, the fixation of the photoacoustic wave generation portion 16, and the strength of the puncture needle main body 15a. The diameter of the through-hole 15e is desirably equal to or greater than 80 μm and is about 30% to 60% of the diameter of the hollow portion 15c of the puncture needle 15.

In addition, it is preferable that the center C of the through-hole 15e is in the vicinity of the tip of the puncture needle main body 15a. The vicinity of the tip of the puncture needle main body 15a means a position where the photoacoustic wave generation portion 16 can generate photoacoustic waves capable of imaging the position of the tip of the puncture needle 15 with accuracy required for a needling operation in a case in which the photoacoustic wave generation portion 16 is disposed at the position of the through-hole 15e. It is preferable that the center C of the through-hole 15e is disposed in the opening 15b and is in the range of, for example, 0.2 mm to 2 mm from the tip of the puncture needle main body 15a.

In addition, it is desirable that the through-hole 15e is formed on a straight line L which extends in the length direction of the puncture needle main body 15a through a position P of the tip of the puncture needle main body 15a in the wall portion 15d forming the hollow portion 15c of the puncture needle main body 15a. Further, it is more preferable that the center C of the through-hole 15e is located on the straight line L.

In this embodiment, the through-hole 15e is formed in a circular shape. However, the invention is not limited thereto. The through-hole 15e may be formed in an elliptical shape that extends in the length direction of the puncture needle 15. In addition, the through-hole 15e may have, for example, a square shape, a rectangular shape that extends in the length direction of the puncture needle 15, a shape between a circular shape and a square shape, or a shape between an elliptical shape and a rectangular shape. Further, the through-hole 15e may be formed in a tapered shape. That is, in the through-hole 15e, the size of an opening close to the inner wall of the puncture needle main body 15a may be less than the size of an opening close to the outer wall.

Figure 25:
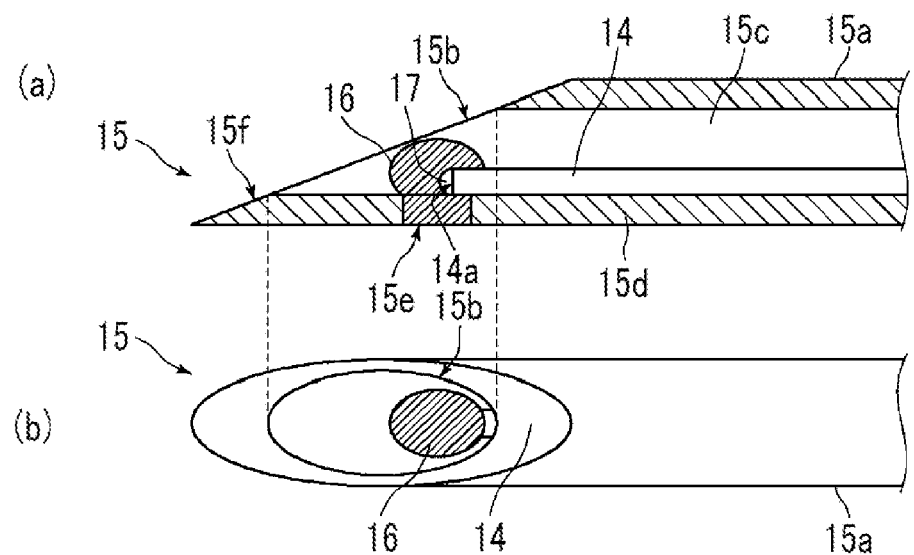
FIG. 25 is a diagram illustrating the configuration of a tip portion of the puncture needle according to the thirty-first embodiment.

FIG. 25 is a diagram illustrating the configuration of a puncture needle 15 obtained by providing the optical fiber 14 having the resin member 17 and the photoacoustic wave generation portion 16 in the puncture needle main body 15a illustrated in FIG. 24, similarly to the puncture needle 15 according to the first embodiment. (a) of FIG. 25 is a cross-sectional view including a central axis that extends in the length direction of the puncture needle 15 and (b) of FIG. 25 is a top view in a case in which the opening 15b of the puncture needle 15 faces upward.

As illustrated in (a) and (b) of FIG. 25, in the puncture needle 15 according to the thirty-first embodiment, the light emission end 14a of the optical fiber 14 and the resin member 17 are disposed above the through-hole 15e of the puncture needle main body 15a and the photoacoustic wave generation portion 16 is provided so as to cover the resin member 17 and the vicinity of the tip of the optical fiber 14.

In the puncture needle 15 illustrated in FIG. 25, the through-hole 15e, the photoacoustic wave generation portion 16, and the resin member 17 are located in the puncture needle 15 such that the photoacoustic wave generation portion 16 does not protrude from the polished surface 15f of the puncture needle 15 as illustrated in (a) of FIG. 25. However, in practice, it is preferable that these components are disposed as close to the tip of the puncture needle 15 as possible in the range in which they do not protrude from the polished surface 15f.

The other configurations of the puncture needle 15 according to the thirty-first embodiment are the same as those of the puncture needle 15 according to the first embodiment.

As a method for manufacturing the puncture needle 15 according to the thirty-first embodiment, first, the optical fiber 14 is inserted into the hollow portion 15c of the puncture needle main body 15a such that the resin member 17 provided at the light emission end 14a of the optical fiber 14 is disposed above the through-hole 15e. Then, while the material forming the photoacoustic wave generation portion 16 is supplied to the resin member 17, the through-hole 15e is filled with the material. After the filling, the material is cured.

As described above, since the photoacoustic wave generation portion 16 is fixed to the through-hole 15e, the photoacoustic waves generated by the photoacoustic wave generation portion 16 can be emitted not only from the opening 15b but also from the through-hole 15e to the outside of the puncture needle 15 and it is possible to effectively propagate the photoacoustic waves on a surface side opposite to the opening 15b of the puncture needle 15. Therefore, it is possible to detect the photoacoustic waves from the through-hole 15e even in a case the opening 15b is opposite to the ultrasound probe 11. As a result, it is possible to detect the tip of the puncture needle 15 with high sensitivity.

In addition, the photoacoustic waves generated by the photoacoustic wave generation portion 16 are emitted from the through-hole 15e without being reflected by the inner wall of the wall portion 15d forming the hollow portion 15c. Therefore, it is possible to suppress the generation of an artifact caused by the photoacoustic waves reflected by an inner metal surface (inner wall) of the puncture needle 15.

Furthermore, the through-hole 15e is filled with the material forming the photoacoustic wave generation portion 16 and the material is cured. Therefore, it is possible to obtain an anchor effect and to enhance the fixation of the photoacoustic wave generation portion 16.

Figure 26:
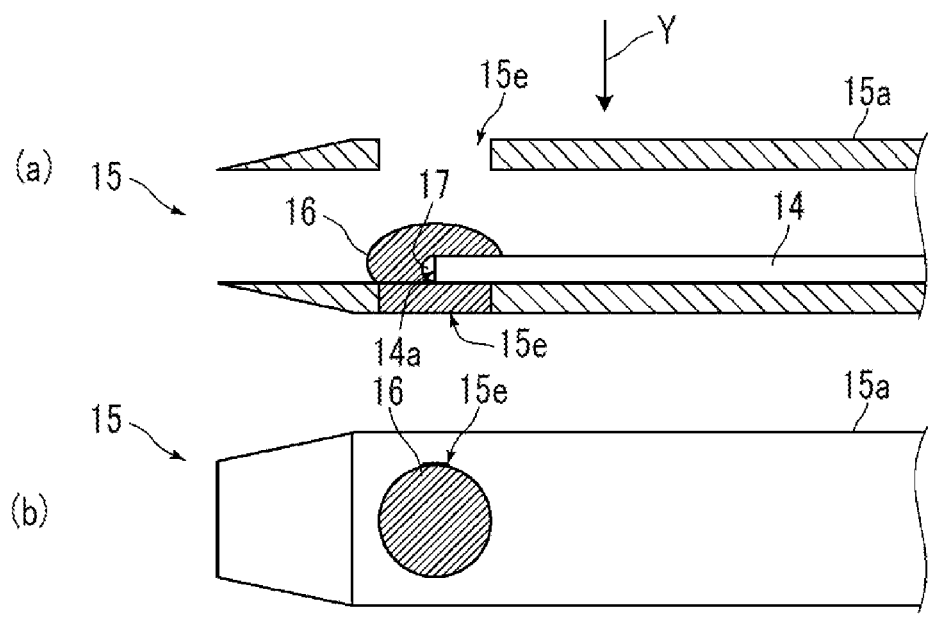
FIG. 26 is a diagram illustrating an embodiment of a puncture needle provided with a plurality of through-holes.

In the puncture needle 15 according to the thirty-first embodiment, one through-hole 15e is provided in the puncture needle main body 15a. However, the invention is not limited thereto. A plurality of through-holes may be provided. FIG. 26 illustrates an embodiment of a puncture needle in which two through-holes are provided in a puncture needle main body. (a) of FIG. 26 is a cross-sectional view including a central axis that extends in the length direction of a puncture needle 15 having two through-holes 15e and (b) of FIG. 26 is a diagram illustrating the puncture needle 15 illustrated in (a) of FIG. 26 as viewed from the direction of an arrow Y In the puncture needle 15 illustrated in FIG. 26, the through-holes 15e are provided at the positions that face each other in the puncture needle main body 15a. Then, the photoacoustic wave generation portion 16 and the resin member 17 are disposed with respect to one of the two through-holes 15e.

As a method for manufacturing the puncture needle 15 illustrated in FIG. 26, the optical fiber 14 is inserted into the puncture needle main body 15a. While the position of the resin member 17 is checked through a through-hole 15e (hereinafter, referred to as a second through-hole 15e) opposite to the through-hole 15e (hereinafter, referred to as a first through-hole 15e) with respect to which the photoacoustic wave generation portion 16 is provided, the resin member 17 is disposed above the first through-hole 15e. Then, while the material forming the photoacoustic wave generation portion 16 is supplied to the resin member 17 through the second through-hole 15e, the first through-hole 15e is filled with the material. After the filling, the material is cured.

The configuration in which two through-holes 15e are provided as in the puncture needle 15 illustrated in FIG. 26 makes it possible to propagate photoacoustic waves from the two through-holes 15e. Therefore, it is possible to detect the photoacoustic waves from any one of the through-holes 15e, regardless of which of the first through-hole 15e and the second through-hole 15e is located close to the ultrasound probe 11. As a result, it is possible to detect the tip of the puncture needle 15 with high sensitivity.

In the puncture needle 15 illustrated in FIG. 26, two through-holes 15e are provided. However, the number of through-holes 15e is not limited to 2. Four through-holes may be provided in directions perpendicular to each other.

The puncture needle 15 according to the thirty-first embodiment is an example in which the through-hole 15e is provided in the puncture needle main body 15a of the puncture needle 15 according to the first embodiment. In the puncture needles 15 according to the second to thirtieth embodiments, similarly to the puncture needle 15 according to the thirty-first embodiment, the through-hole 15e may be formed in the puncture needle main body 15a, the resin member 17 or the polished light emission end 14a of the optical fiber may be disposed above the through-hole 15e, and the photoacoustic wave generation portion 16 may be formed so as to cover the resin member 17 or the polished light emission end 14a of the optical fiber. In addition, in the puncture needles 15 according to the second to thirtieth embodiments, a plurality of through-holes 15e may be formed.

Figure 27:
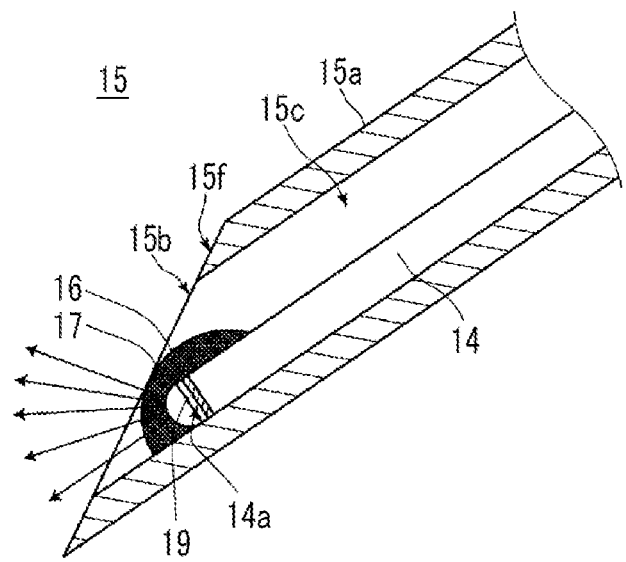
FIG. 27 is a diagram illustrating an embodiment of a puncture needle having a primer layer provided between an optical fiber and a resin member.

As in the puncture needle 15 according to the fifth embodiment, in the puncture needle 15 in which the light emission end 14a of the optical fiber 14 is roughly polished, it is preferable that a primer layer 19 is formed between the light emission end 14a of the optical fiber 14 and the resin member 17, as illustrated in FIG. 27. The primer layer 19 is an adhesive layer that facilitates the adhesion between the light emission end 14a of the optical fiber 14 and the resin member 17 and is made of a material which is adhesive to both the light emission end 14a of the optical fiber 14 and the resin member 17. The formation of the primer layer 19 makes it possible to improve the adhesion between the optical fiber 14 and the resin member 17.

In the puncture needles 15 according to the sixth to eighth, thirteenth to sixteenth, and twenty-first to twenty-fourth embodiments in which the light emission end 14a of the optical fiber 14 is roughly polished as in the puncture needle 15 according to the fifth embodiment, it is preferable that the primer layer 19 is formed between the light emission end 14a of the optical fiber 14 and the resin member 17.

In the puncture needles 15 according to the fifth to eighth, thirteenth to sixteenth, and twenty-first to twenty-fourth embodiments, it is preferable that the resin member 17 or the primer layer 19 is formed immediately after the rough polishing process is performed for the light emission end 14a of the optical fiber 14.

Figure 28:
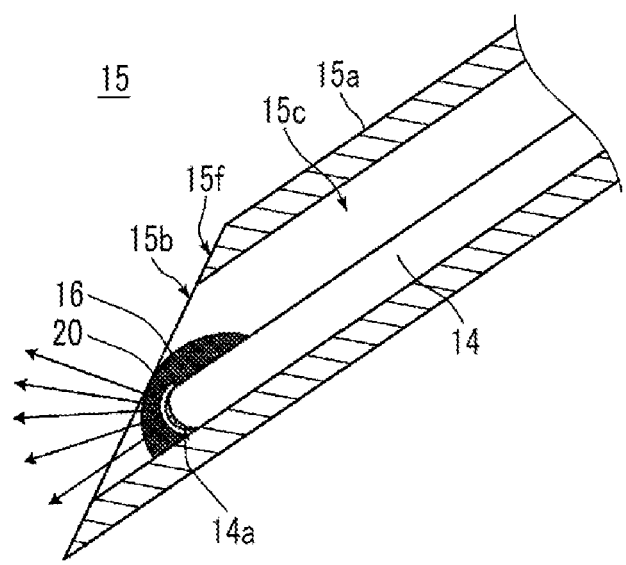
FIG. 28 is a diagram illustrating an embodiment of a puncture needle having a primer layer provided between an optical fiber and a photoacoustic wave generation portion.

In the puncture needle 15 in which the light emission end 14a of the optical fiber 14 is polished into a hemispherical shape and the hemispherical surface is roughly polished as in the puncture needle 15 according to the twenty-sixth embodiment, it is preferable that a primer layer 20 is formed between the light emission end 14a of the optical fiber 14 and the photoacoustic wave generation portion 16, as illustrated in FIG. 28. The primer layer 20 is an adhesive layer that facilitates the adhesion between the light emission end 14a of the optical fiber 14 and the photoacoustic wave generation portion 16 and is made of a material which is adhesive to both the light emission end 14a of the optical fiber 14 and the photoacoustic wave generation portion 16. The formation of the primer layer 20 makes it possible to improve the adhesion between the optical fiber 14 and the photoacoustic wave generation portion 16.

Similarly to the puncture needle 15 according to the twenty-sixth embodiment, in the puncture needles 15 according to the twenty-eighth and thirtieth embodiments in which the light emission end 14a of the optical fiber 14 is roughly polished, it is preferable that the primer layer 20 is formed between the light emission end 14a of the optical fiber 14 and the photoacoustic wave generation portion 16.

In the puncture needles 15 according to the twenty-sixth, twenty-eighth, and thirtieth embodiments, it is preferable that the photoacoustic wave generation portion 16 or the primer layer 20 is formed immediately after the rough polishing process is performed for the light emission end 14a of the optical fiber 14.

In the above-described embodiments, the puncture needle 15 is considered as the insert. However, the invention is not limited thereto. The insert may be a radio-frequency ablation needle including an electrode that is used for radio-frequency ablation, a catheter that is inserted into a blood vessel, or a guide wire for a catheter that is inserted into a blood vessel. In particular, in the catheter, the tip of the tube may not need to be sharp and may be cut at a right angle at a position where the resin member does not come out. Further, instead of covering the tip of the catheter with a resin that generates photoacoustic waves, a slit that functions as a liquid injection hole or valve may be added to the side of the catheter.

The insert according to the embodiment of the invention is not limited to a needle, such as an injection needle, and may be a biopsy needle used for biopsy. That is, the insert may be a biopsy needle that is inserted into an inspection target of the living body and extracts the tissues of a biopsy site of the inspection target. In this case, photoacoustic waves may be generated from an extraction portion (intake port) for sucking and extracting the tissues of the biopsy site. In addition, the needle may be used as a guiding needle that is used for insertion into a deep part, such as a part under the skin or an organ inside the abdomen. The insert may also be used as a needle that passes through an endoscope and comes out of the forceps port.

The invention has been described above on the basis of the preferred embodiments. However, the insert and the photoacoustic measurement device according to the embodiment of the invention are not limited only to the above-described embodiments. Various modifications and changes of the configurations according to the above-described embodiments are also included in the scope of the invention.

EXPLANATION OF REFERENCES

10: photoacoustic image generation apparatus
11: ultrasound probe
12: ultrasound unit
13: laser unit
14: optical fiber
14a: light emission end
14b: side surface
15: puncture needle
15a: puncture needle main body
15b: opening
15c: hollow portion
15d: wall portion
15e: through-hole
15f: polished surface
16: photoacoustic wave generation portion
17: resin member
18: adhesive resin
19: primer layer
20: primer layer
21: receiving circuit
22: receiving memory
23: data demultiplexing unit
24: photoacoustic image generation unit
25: ultrasound image generation unit
26: image output unit
27: transmission control circuit
28: control unit
30: image display unit
70: optical cable
72: connector
C: center of through-hole
L: straight line
P: position of tip of puncture needle main body
Y: arrow

What is claimed is:

1. An insert comprising:
an insert main body which has an opening at a tip thereof and is formed in a hollow shape, at least a tip portion of the insert main body being configured to be inserted into a subject;
a light guide member comprising an optical fiber, the light guide member being disposed in a hollow portion of the insert main body along a length direction of the insert main body; and
a photoacoustic wave generation portion comprising a material fixed to an inner wall of the insert main body at a light emission end of the light guide member, the light emission end being disposed at a tip side of the insert main body, and the material being configured to absorb light emitted from the light emission end and generate photoacoustic waves,
wherein the light emission end of the light guide member has a first curved shape,
wherein the light guide member has a resin member that transmits light, that is disposed at an end face of a light emission end of the optical fiber such that the resin member contacts no portion of the optical fiber other than the end face, and that has a surface shape formed with the first curved shape, and
wherein a surface of the light emission end of the optical fiber is rougher than a surface of a light incident end of the optical fiber.

2. The insert according to claim 1,
wherein the light emission end of the light guide member has a hemispherical shape.

3. The insert according to claim 1,
wherein the resin member is made of a resin having light diffusion properties.

4. The insert according to claim 3,
wherein the resin member includes a pigment that imparts light diffusion properties.

5. The insert according to claim 1, further comprising:
a primer layer between the optical fiber and the resin member.

6. The insert according to claim 1,
wherein the resin member is made of an ultraviolet-curable resin.

7. The insert according to claim 1,
wherein the photoacoustic wave generation portion is made of an ultraviolet-curable resin including a pigment that absorbs light guided by the light guide member.

8. The insert according to claim 7,
wherein the photoacoustic wave generation portion is fixed to the insert main body via the ultraviolet-curable resin.

9. The insert according to claim 1,
wherein the insert main body is a needle configured to be inserted into the subject.

10. The insert according to claim 1,
wherein the insert main body is a catheter.

11. A photoacoustic measurement device comprising:
the insert according to claim 1;
a light source configured to emit light which is absorbed by the photoacoustic wave generation portion of the insert; and
an ultrasound probe configured to detect photoacoustic waves generated from the photoacoustic wave generation portion after at least a portion of the insert is inserted into the subject.

* * * * *